(12) United States Patent
Beaurepaire et al.

(10) Patent No.: US 12,281,906 B2
(45) Date of Patent: Apr. 22, 2025

(54) APPARATUS AND METHODS FOR PROVIDING VEHICLE SIGNATURE REDUCTION

(71) Applicant: HERE GLOBAL B.V., Eindhoven (NL)

(72) Inventors: Jerome Beaurepaire, Berlin (DE); Marko Tuukkanen, Tuukkanen (DE)

(73) Assignee: HERE GLOBAL B.V., Eindhoven (NL)

( * ) Notice: Subject to any disclaimer, the term of this patent is extended or adjusted under 35 U.S.C. 154(b) by 709 days.

(21) Appl. No.: 17/394,725

(22) Filed: Aug. 5, 2021

(65) Prior Publication Data
US 2023/0039537 A1 Feb. 9, 2023

(51) Int. Cl.
*G01C 21/34* (2006.01)
*G01C 21/00* (2006.01)
*G01C 21/36* (2006.01)

(52) U.S. Cl.
CPC ..... *G01C 21/3461* (2013.01); *G01C 21/3605* (2013.01); *G01C 21/3815* (2020.08)

(58) Field of Classification Search
None
See application file for complete search history.

(56) References Cited

U.S. PATENT DOCUMENTS

| | | | | |
|---|---|---|---|---|
| 5,991,689 | A * | 11/1999 | Aito | G08G 1/096844 701/425 |
| 11,310,269 | B2 * | 4/2022 | Liu | H04L 63/1425 |
| 2005/0088320 | A1 * | 4/2005 | Kovach | G08B 13/2462 340/932.2 |
| 2009/0174778 | A1 * | 7/2009 | Allen | G07B 15/063 348/149 |
| 2020/0219401 | A1 | 7/2020 | Ren et al. | |

FOREIGN PATENT DOCUMENTS

| | | | |
|---|---|---|---|
| CN | 103338444 | A | 10/2013 |
| CN | 108616813 | A | 10/2018 |
| CN | 111371560 | A | 7/2020 |
| JP | 2010276553 | * | 5/2009 |
| KR | 101894666 | B1 | 9/2018 |

OTHER PUBLICATIONS

Andreas Tomandl et al., PADAVAN: Privacy-Aware Data Accumulation for Vehicular Ad-hoc Networks, University of Hamburg, Germany.

(Continued)

*Primary Examiner* — Hongye Liang
(74) *Attorney, Agent, or Firm* — Peter H. Yu; HERE GLOBAL B.V.

(57) ABSTRACT

An apparatus, method and computer program product are provided for providing signature reduction for a vehicle. For example, the apparatus receives a destination for a vehicle as input, selects a subset from a plurality of road segments as a route from a location to the destination, and outputs the route or a portion thereof. The subset is selected based on association of each of the plurality of road segments with respect to a source, and the source is capable of acquiring vehicle signature information.

11 Claims, 16 Drawing Sheets

(56) References Cited

OTHER PUBLICATIONS

Mengjia Zeng et al., Mix-Context-Based Pseudonym Changing Privacy Preserving Authentication in VANETs, Jun. 2, 2019, vol. 2019, Article ID 3109238, Hindawi.

Jianbing NI et al., Privacy-Preserving Real-Time Navigation System Using Vehicular Crowdsourcing, Department of Electrical and Computer Engineering, University of Waterloo, Waterloo, Ontario, Faculty of Business and Information Technology, University of Ontario Institute of Technology, Oshawa, Ontario, Canada L1H 7K4.

Ismaila A. Kamil et al., On the security of privacy-preserving authentication scheme with full aggregation in vehicular ad hoc network, Jan. 8, 2020, Wiley Online Library.

* cited by examiner

APPARATUS AND METHODS FOR PROVIDING VEHICLE SIGNATURE REDUCTION

TECHNICAL FIELD

The present disclosure generally relates to the field of vehicle signature reduction, associated methods and apparatus, and in particular concerns, for example, an apparatus configured to provide vehicle signature reduction based on location of one or more potential adversarial sources with respect to the vehicle.

BACKGROUND

A potential adversarial source may be equipped with sensors and acquire signature information associated with a vehicle without the vehicle owner's permission, thereby enabling the signature information to be easily shared with other devices and facilitating potential illicit activities targeted towards such vehicle. Therefore, there is a need in the art to remedy such issue.

The listing or discussion of a prior-published document or any background in this specification should not necessarily be taken as an acknowledgement that the document or background is part of the state of the art or is common general knowledge.

BRIEF SUMMARY

According to a first aspect, a non-transitory computer-readable storage medium having computer program code instructions stored therein is described. The computer program code instructions, when executed by at least one processor, cause the at least one processor to receive a destination for a vehicle as input, select a subset from a plurality of road segments as a route from a location to the destination, and output the route or a portion thereof. The subset is selected based on association of each of the plurality of road segments with respect to a source, and the source is capable of acquiring vehicle signature information.

According to a second aspect, a non-transitory computer-readable storage medium having computer program code instructions stored therein is described. The computer program code instructions, when executed by at least one processor, cause the at least one processor to determine a signature reduction distance for a first vehicle and generate a signal that causes: (i) a display device associated with the first vehicle to display the signature reduction distance; (ii) the first vehicle to move based on the signature reduction distance; or (iii) a combination thereof. The signature reduction distance establishes signature reduction for the first vehicle with respect to a second vehicle.

According to a third aspect, a method of updating a map layer for providing vehicle signature reduction is described. The method includes receiving source attribute data associated with a source. The attribute data are derived from sensor data, and the source is capable of acquiring vehicle signature information. The method further includes generating a data point for the map layer using the source attribute data, where the data point indicates a location of the source. The method further includes storing the data point in a database associated with the map layer. The map layer includes the data point and one or more other data points that indicate one or more other locations of one or more other sources.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

The steps of any method disclosed herein do not have to be performed in the exact order disclosed, unless explicitly stated or understood by the skilled person.

Corresponding computer programs (which may or may not be recorded on a carrier) for implementing one or more of the methods disclosed herein are also within the present disclosure and encompassed by one or more of the described example embodiments.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

BRIEF DESCRIPTION OF THE DRAWINGS

The embodiments of the invention are illustrated by way of example, and not by way of limitation, in the figures of the accompanying drawings.

DETAILED DESCRIPTION

Potential adversarial sources, such as vehicles, constructs, and/or stationary devices, that are within or proximate to a road network may be equipped with sensors and/or communication means (e.g., a transceiver) and acquire signature information associated with a target vehicle using said devices. The signature information may define or indicate: (1) physical characteristics of the target vehicle such as a vehicle shape, a vehicle type, a vehicle colour, a vehicle size, modifications added to the vehicle, etc.; (2) identification information (e.g., plate number, vehicle identification number, vehicle identifiers for communication protocols, etc.); (3) other information related to the target vehicle such as driving patterns, travel patterns, vehicle settings, etc.; (4) or a combination thereof. The physical characteristics of a target vehicle may be captured by external sensors, such as cameras and/or lidars, and nontangible characteristics of the target vehicle may be acquired through communication means (e.g., signal interception). The acquired signature information may be shared with other sources, thereby increasing the likelihood of the signature information being provided to an actual adversarial source. The adversarial source may use the signature information to facilitate illicit activities targeted towards the vehicle, such as vehicle theft or identity theft, or draw unsolicited attention towards the target vehicle.

There will now be described an apparatus and associated methods that may address these issues.

Figure 1A:
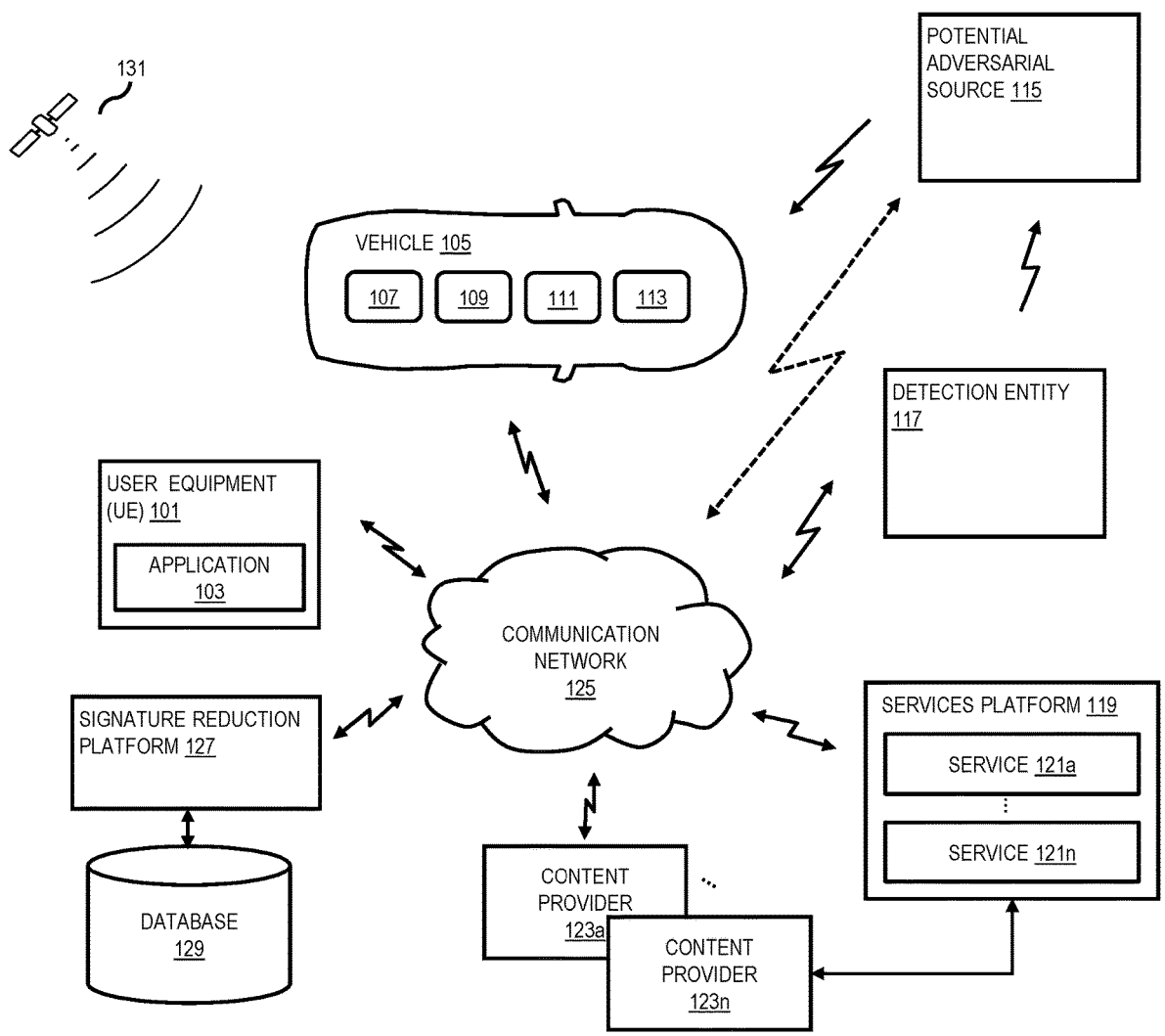
FIG. 1A illustrates a diagram of a system capable of providing signature reduction for a vehicle.

FIG. 1A is a diagram of a system 100 capable of providing signature reduction for a vehicle, according to one embodiment. Herein, signature reduction performed for a vehicle (also referred herein as "vehicle signature reduction") refers to one or more functions performed by the vehicle or in association with the vehicle to mitigate or negate detection of signature information associated with the vehicle. The system includes a user equipment (UE) 101, a vehicle 105, a potential adversarial source 115, a detection entity 117, a services platform 119, content providers 123a-123n, a communication network 125, a signature reduction platform 127, a database 129, and a satellite 131. Additional or a plurality of mentioned components may be provided.

In the illustrated embodiment, the system 100 comprises a user equipment (UE) 101 that may include or be associated with an application 103. In one embodiment, the UE 101 has connectivity to the signature reduction platform 127 via the communication network 125. The signature reduction platform 127 performs one or more functions associated with providing signature reduction for the vehicle 105 based on a location of the potential adversarial source 115. In the illustrated embodiment, the UE 101 may be any type of mobile terminal or fixed terminal such as a mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, devices associated with or integrated with one or more vehicles (including the vehicle 105), or any combination thereof, including the accessories and peripherals of these devices. In one embodiment, the UE 101 can be an in-vehicle navigation system, a personal navigation device (PND), a portable navigation device, a cellular telephone, a mobile phone, a personal digital assistant (PDA), a watch, a camera, a computer, etc. In one embodiment, the one or more vehicles may have cellular or Wi-Fi connection either through the inbuilt communication equipment or from the UE 101 associated with the vehicles. It should be appreciated that the UE 101 can support any type of interface to the user (such as "wearable" devices, etc.). A user may use the UE 101 for providing input and/or receiving output associated with signature reduction functions (e.g., initiating signature reduction, selecting features associated with signature reduction, receiving information associated with signature reduction, etc.). Specifically, the application 103 may be used to execute the functions associated with signature reduction. In one embodiment, the application 103 may assist in conveying information regarding at least one attribute associated a travel link via the communication network 125. Herein, a travel link includes road links (e.g., a stretch of road) and/or nodes (e.g., points where two or more road links connect). The travel link may indicate a navigational route to a destination requested by a user.

In the illustrated embodiment, the application 103 may be any type of application that is executable by the UE 101, such as a vehicle signature reduction application, a mapping application, a location-based service application, a navigation application, a content provisioning service, a camera/imaging application, a media player application, a social networking application, a calendar application, or any combination thereof. In one embodiment, one of the applications 103 at the UE 101 may act as a client for the signature reduction platform 127 and perform one or more functions associated with the functions of the signature reduction platform 127 by interacting with the signature reduction platform 127 over the communication network 125.

The vehicle 105 may be a standard gasoline powered vehicle, a hybrid vehicle, an electric vehicle, a fuel cell vehicle, and/or any other mobility implement type of vehicle. The vehicle 105 includes parts related to mobility, such as a powertrain with an engine, a transmission, a suspension, a driveshaft, and/or wheels, etc. The vehicle 105 may be a manually controlled vehicle, semi-autonomous vehicle (e.g., some routine motive functions, such as parking, are controlled by the vehicle 105), or an autonomous vehicle (e.g., motive functions are controlled by the vehicle 105 without direct driver input). In this illustrated example, the vehicle 105 includes a plurality of sensors 107, an on-board computing platform 109, an on-board communications platform 111, and a signature reduction device 113.

The autonomous level of a vehicle can be a Level 0 autonomous level that corresponds to no automation for the vehicle, a Level 1 autonomous level that corresponds to a certain degree of driver assistance for the vehicle, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle. In one embodiment, the UE 101 may be integrated in the vehicle 105, which may include assisted driving vehicles such as autonomous vehicles, highly assisted driving (HAD), and advanced driving assistance systems (ADAS). Any of these assisted driving systems may be incorporated into the UE 101. Alternatively, an assisted driving device (not illustrated) may be included in the vehicle 105. The assisted driving device may include memory, a processor, and systems to communicate with the UE 101.

The term autonomous vehicle may refer to a self-driving or driverless mode in which no passengers are required to be on board to operate the vehicle. An autonomous vehicle may be referred as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate and respond to lane marking indicators (lane marking type, lane marking intensity, lane marking color, lane marking offset, lane marking width, or other characteristics) and driving commands or navigation commands. Such driving commands or navigation may be provided by the signature reduction platform 127, thereby enabling the signature reduction platform 127 to control the autonomous vehicles in accordance with functions associated with vehicle signature reduction.

In one embodiment, the vehicle 105 may be an HAD vehicle or an ADAS vehicle. An HAD vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to lane marking indicators (lane marking type, lane marking intensity, lane marking color, lane marking offset, lane marking width, or other characteristics) and driving commands or navigation commands. Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) and driving commands or navigation commands.

In the illustrated embodiment, the sensors 107 may include image sensors (e.g., electronic imaging devices of both analog and digital types, which include digital cameras, camera modules, camera phones, thermal imaging devices, radar, sonar, lidar, etc.), a global positioning sensor for gathering location data, a signal detection sensor for detecting wireless signals or receivers for different short-range communications (e.g., Bluetooth, Wi-Fi, Li-Fi, near field communication (NFC), etc.), temporal information sensors, an audio recorder for gathering audio data, velocity sensors, light sensors, oriental sensors augmented with height sensor and acceleration sensor, tilt sensors to detect the degree of incline or decline of the vehicle 105 along a path of travel, etc. In a further embodiment, sensors about the perimeter of the vehicle 105 may detect the relative distance of the vehicle 105 from other vehicles, establishments, stationary sensory devices within an area, road objects (e.g., road markings), lanes, or roadways, pedestrians, traffic lights, road features (e.g., curves) and any other objects, or a combination thereof. In one embodiment, the vehicle 105 may include GPS receivers to obtain geographic coordinates from satellites 131 for determining current location and time associated with the vehicle 105. Further, the location can be determined by a triangulation system such as A-GPS, Cell of Origin, or other location extrapolation technologies. One or more of the sensors 107 may be installed on the exterior surface or external components of the vehicle 105, within the interior cabin of the vehicle 105, between the interior cabin and the exterior surface of the vehicle 105, or a combination thereof.

The on-board computing platform 109 performs one or more functions associated with the vehicle 105. In one embodiment, the on-board computing platform 109 may aggregate sensor data generated by at least one of the sensors 107 and transmit the sensor data via the on-board communications platform 111. The on-board computing platform 109 may receive control signals and/or other signals for performing one or more of the functions associated with the signature reduction platform 127, the UE 101, the services platform 119, one or more of the content providers 123*a*-123*n*, or a combination thereof via the on-board communications platform 111. The on-board computing platform 109 includes at least one processor or controller and memory (not illustrated). The processor or controller may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory.

The on-board communications platform 111 includes wired or wireless network interfaces to enable communication with external networks. The on-board communications platform 111 also includes hardware (e.g., processors, memory, storage, antenna, etc.) and software to control the wired or wireless network interfaces. In the illustrated example, the on-board communications platform 111 includes one or more communication controllers (not illustrated) for standards-based networks (e.g., Global System for Mobile Communications (GSM), Universal Mobile Telecommunications System (UMTS), Long Term Evolution (LTE) networks, 5G networks, Code Division Multiple Access (CDMA), WiMAX (IEEE 802.16m); NFC; local area wireless network (including IEEE 802.11 a/b/g/n/ac or others), dedicated short range communication (DSRC), and Wireless Gigabit (IEEE 802.11ad), etc.). In some examples, the on-board communications platform 111 includes a wired or wireless interface (e.g., an auxiliary port, a Universal Serial Bus (USB) port, a Bluetooth® wireless node, etc.) to communicatively couple with the UE 101. In one embodiment, the on-board communications platform 111 may function as a signal detection sensor for detecting wireless signals or receivers for different long-range communications. In one embodiment, the on-board communications platform 111 may be associated with or integrated with the short-range signal detection sensor of the sensors 107 and assist in performing the short-range communications.

The signature reduction device 113 may be capable of performing one or more functions for reducing signature information associated with the vehicle 105. In one embodiment, the signature reduction device 113 may be a combination of instructions embodied within a computer readable medium (e.g., memory device within the on-board computing platform 109, an ECU, UE 101, the signature reduction platform 127, etc.) and transmitters/receivers of the vehicle 105 (e.g., transmitters/receivers of short-range signal detection sensors within sensors 107, transmitters/receivers of long-range signal detection sensors within the on-board communications platform 111, or other transmitters/receivers within the vehicle 105). In such embodiment, when the signature reduction device 113 receives a request for reducing signature information, the signature reduction device 113 may disable one or more of the transmitters/receivers of the vehicle 105, reduce detectability of signal generated by said transmitter (e.g., by encoding signals, altering frequency and/or amplitude of the output signal, etc.), reduce a range at which the receivers receive signals, etc. In one embodiment, the signature reduction device 113 may be a combination of instructions embodied within a computer readable medium and one or more light generating devices (not illustrated) mounted on external surfaces of the vehicle 105 (e.g., organic light-emitting diodes (OLED)). The one or more light generating device may be used to avoid detection via image sensors by altering colour, brightness, design, and/or pattern generated by said light generating devices. In one embodiment, the signature reduction device 113 may be a combination of instructions embodied within a computer readable medium and a machinery (not illustrated) that is capable of altering at least a portion of an overall shape of the vehicle 105. By way of example, said machinery may be a retractable spoiler, a vehicle convertible, etc. Such alteration of a physical attribute of a vehicle may also aid in avoiding detection via image sensors. It should be appreciated that the signature reduction device 113 may be other devices that aid in camouflaging the vehicle 105 or avoiding detection of the vehicle 105 via conventional sensors. Since the aforementioned technologies described with respect to the signature reduction device 113 is generally known in the art, details thereof will not be described herein for brevity.

The potential adversarial source 115 may be an entity that is capable of acquiring signature information associated with a vehicle. In one embodiment, the potential adversarial source 115 may acquire the signature information without receiving consent from the vehicle. In one embodiment, the potential adversarial source 115 may fraudulently acquire the consent to acquire the signature information. The potential adversarial source 115 may be equipped with one or more sensors, receivers, transmitters, or any other devices that are capable of acquiring signature information. By way of example, the potential adversarial source 115 may be another vehicle, a building equipped with sensors, or a sensor disposed within a road network (e.g., a traffic camera, lidar, etc.). In one embodiment, the potential adversarial source 115 may be communicatively coupled to the communication network 125. In one embodiment, the potential adversarial source 115 may be separate and independent from the communication network 125. In one embodiment, the potential adversarial source 15 may be communicatively coupled to one or more components within the system 100 and/or be separate and independent from one or more other components within the system 100. In the illustrated embodiment, the potential adversarial source 115 may be the only component within the system 100 that is not trusted by the vehicle 105.

The detection entity 117 may be a trusted source that is capable of acquiring information associated with the potential adversarial source 115 and/or is a trusted database including information associated with the potential adversarial source 115. The detection entity 117 may be equipped with one or more sensors, receivers, transmitters, or any other devices that are capable of acquiring information associated with the potential adversarial source 115. By way of example, the detection entity 117 may be another vehicle that is proximate to the potential adversarial source 115, a building equipped with sensors and is proximate to the potential adversarial source 115, or a sensor disposed within a road network (e.g., a traffic camera, lidar, etc.) and is proximate to the adversarial source 115. In one embodiment, the potential adversarial source 115 may be positioned within a detection range associated with the detection entity 117, where the detection range defines a range at which a sensor of the detection entity 117, a receiver of the detection entity 117, a transmitter of a detection entity 117, or a combination thereof is capable of sensing or establishing communication with the potential adversarial source 115. In one embodiment, the detection entity 117 may be physically distant from the potential adversarial source 115 and be communicatively coupled to the potential adversarial source 115 by being connected to or being associated with a same network or system (not illustrated). The information associated with the potential adversarial source 115 include attribute data. The attribute data may indicate spatial information associated with the potential adversarial source (e.g., speed/heading of the potential adversarial source, a travel link of the potential adversarial source, etc.), a type of potential adversarial source (e.g., vehicle, building, street sensor, etc.), physical characteristics of the potential adversarial source (e.g., size, dimension, color, etc.), type of equipped sensors, number of sensors, orientation of the sensors, detection range of the sensors, other sensor-related specifications, or a combination thereof. The detection entity 117 is further capable of acquiring and/or storing information associated with: (1) physical objects within or proximate to a road network (e.g., buildings, type of buildings, density of buildings, size of buildings, etc.); (2) a weather condition affecting the road network (e.g., type of weather, magnitude of weather, etc.); (3) a physical environment associated with the road network (e.g., mountains, tunnels, trees, etc.); (4) amount of lighting available within one or more areas within the road network (e.g., sun angle, amount of artificial lights within the road network, etc.); or (5) a combination thereof.

The services platform 119 may be an original equipment manufacturer (OEM) platform that provides one or more services 121a-121n (collectively referred to as services 121). In one embodiment the one or more service 121 may be sensor data collection services. By way of example, vehicle sensor data provided by the sensors 107 may be transferred to the UE 101, the signature reduction platform 127, the database 129, or other entities communicatively coupled to the communication network 125 through the services platform 119. By way of example, the services platform 119 may also be other third-party services and include mapping services, navigation services, travel planning services, notification services, social networking services, content (e.g., audio, video, images, etc.) provisioning services, application services, storage services, contextual information determination services, weather-based services, location-based services, information-based services, etc. In one embodiment, the services platform 119 uses the output data generated by of the signature reduction platform 127 to provide services such as navigation, mapping, other location-based services, etc.

In one embodiment, the content providers 123a-123n (collectively referred to as content providers 123) may provide content or data (e.g., including geographic data, parametric representations of mapped features, etc.) to the UE 101, the vehicle 105, detection entity 117, services platform 119, the signature reduction platform 127, the database 129, or the combination thereof. The content provided may be any type of content, such as map content, textual content, audio content, video content, image content, etc. In one embodiment, the content providers 123 may provide content that may aid in providing signature reduction for a vehicle, or other related characteristics. In one embodiment, the content providers 123 may also store content associated with the UE 101, the vehicle 105, detection entity 117, services platform 119, the signature reduction platform 127, the database 129, or the combination thereof. In another embodiment, the content providers 123 may manage access to a central repository of data, and offer a consistent, standard interface to data, such as a repository of the database 129.

The communication network 125 of system 100 includes one or more networks such as a data network, a wireless network, a telephony network, or any combination thereof. The data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In the illustrated embodiment, the signature reduction platform 127 may be a platform with multiple interconnected components. The signature reduction platform 127 may include multiple servers, intelligent networking devices, computing devices, components and corresponding software for providing signature reduction for a vehicle. It should be appreciated that that the signature reduction platform 127 may be a separate entity of the system 100, included within the UE 101 (e.g., as part of the applications 103), included within the vehicle 105 (e.g., as part of an application stored in memory of the on-board computing platform 109), included within the services platform 119 (e.g., as part of an application stored in server memory for the services platform 119), included within the content providers 123 (e.g., as part of an application stored in server memory for the content providers 123), or a combination thereof.

The signature reduction platform 127 is capable of performing one or more signature reduction functions for the vehicle 105. A signature reduction function may be: (1) defined by a function performed by the signature reduction device 113; (2) causing the vehicle 105 to maneuver or a user device associated with the vehicle 105 (e.g., UE 101) to notify a travel link based on a location of the potential adversarial source 115; or (3) a combination thereof. By way of example, the functions performed by the signature reduction device 113 may be: (1) altering visual characteristics of the vehicle 105 (e.g., by causing one or more light generating devices mounted on the exterior of the vehicle 105 to generate a certain visual, by causing a machinery to alter the shaped of the vehicle 105, etc.); (2) disabling or reducing operations associated with transmitters, receivers, or a combination thereof included in the vehicle 105; (3) establishing encoding/decoding model for communication between the vehicle 105 and an entity; or (4) a combination thereof. Continuing from above, the signature reduction platform 127 may determine the location of the potential adversarial source 115 and provide a travel link based on the location or cause the vehicle 105 to move based on the location. In one embodiment, the signature reduction platform 127 may acquire location information associated with the potential adversarial source 115 from the detection entity 117 or directly from the potential adversarial source 115 through the communication network 125. Further, the signature reduction platform 127 may assign a detection range associated with the potential adversarial source 115, where the detection range indicates a range at which the potential adversarial source 115 is capable of acquiring signature information from a vehicle. The signature reduction platform 127 may determine the detection range based on at least one attribute data associated with the potential adversarial source 115. By way of example, the signature reduction platform 127 may receive attribute data indicating that the potential adversarial source 115 is a vehicle and is equipped with cameras. Using such data, the signature reduction platform 127 determines the detection range of the potential adversarial source 115, where the detection range corresponds to a range at which the cameras are capable of capturing images including the vehicle 105. The attribute data may indicate spatial information associated with the potential adversarial source (e.g., speed/heading of the potential adversarial source, a travel link of the potential adversarial source, etc.), a type of potential adversarial source (e.g., vehicle, building, street sensor, etc.), physical characteristics of the potential adversarial source (e.g., size, dimension, color, etc.), type of equipped sensors, number of sensors, orientation of the sensors, detection range of the sensors, other sensor-related specifications, or a combination thereof. In one embodiment, attribute data may indicate the location information associated with the potential adversarial source 115. The detection range may be integrated into map data, such that a map may indicate a number of map-related elements (e.g., road segments) that are associated the detection range (e.g., a road segment is abutting or overlapped with the detection range). The detection range may be affixed to the location of the potential adversarial source 115. As such, the signature reduction platform 127 can automatically determine the location of the detection range based on the location of the potential adversarial source 115. In one embodiment, the signature reduction platform 127 may identify one or more obstructing factors that define objects or environmental factors affecting the detection range of the potential adversarial source 115 and modify the detection range based on the obstructing factors. An obstructing factor may be: (1) physical objects within the detection range (e.g., buildings, type of buildings, density of buildings, size of buildings, etc.); (2) a weather condition affecting an area within the detection range (e.g., type of weather, magnitude of weather, etc.); (3) a physical environment within the detection range (e.g., mountains, tunnels, trees, etc.); (4) amount of lighting available within the detection range (e.g., day or night time, amount of artificial lights within the detection range, etc.); or (5) a combination thereof.

In one embodiment, the signature reduction platform 127 may modify a shape of the detection range based on the obstructing factor. By way of example, the potential adversarial source 115 may be equipped with a camera, and the signature reduction platform 127 may determine that the obstructing factor is a building within the detection range of the camera. Accordingly, the shape of the detection range may be limited based on location and outer shape of the building. By way of another example, the potential adversarial source 115 may be equipped with a visible camera, and the signature reduction platform 127 may determine that the obstructing factor is lack of light within a given area of the detection range of the camera. Accordingly, the shape of the detection range may be limited based on the area that is lacking light.

In one embodiment, the signature reduction platform 127 may assign a level of detectability for one or more areas within the detection range based on the obstructing factor. By way of example, the potential adversarial source 115 may be equipped with a transmitter/receiver, and the signature reduction platform 127 may determine that the obstructing factor is a cluster of buildings within the detection range of the transmitter/receiver. Since a cluster of buildings impact signal propagating therethrough, the signature reduction platform 127 may assign a level of detectability for an area including the cluster of building as having a "low" level; whereas, a level of detectability for an area within the detection range without a physical medium (e.g., mountains, trees, buildings, etc.) would be assigned as a "high" level. In one embodiment, an area having a "low" level of detectability may indicate that the signature reduction platform 127 is uncertain whether the potential adversarial source 115 is capable of acquiring signature information from a vehicle within the area. In one embodiment, an area having a "low" level of detectability may indicate that the potential adversarial source 115 is not capable of acquiring signature information from a vehicle within the area. In one embodiment, a level of detectability for an area may indicate a likelihood of which the potential adversarial source 115 is capable of acquiring signature information from a vehicle within the area.

Once the detection range is defined for the potential adversarial source 115, the signature reduction platform 127 may generate a travel link based on the detection range and the location of the potential adversarial source 115. In one embodiment, the signature reduction platform 127 may generate a travel link such that the travel link completely avoids the detection range; however, it is contemplated that users inherently favour low estimated-time-of-arrival (ETA) for a vehicle route. Additionally, it is contemplated that, under certain circumstances, the signature reduction platform 127 may not be able to generate a travel link that completely avoids the potential adversarial source 115 and the detection range thereof. By way of example, the vehicle 105 and the potential adversarial source 115 may be traversing in the same direction, and the potential adversarial source 115 may suddenly reverse its direction of travel. As such, in one embodiment, the signature reduction platform 127 may identify an amount of time that the vehicle 105 may be within the detection range without having the signature information associated with the vehicle 105 being acquired by the potential adversarial source 115 (will be referred as "detection avoidance period," herein). By way of example, the attribute data associated with the potential adversarial source 105 may indicate a type of transceiver equipped by the potential adversarial source 105 and a communication protocol associated with the transceiver. Based on the type and the communication protocol, the signature reduction platform 127 may identify the detection avoidance period. In one embodiment, the detection avoidance period may also be affected by one or more obstructing factors. By way of example, the signature reduction platform 127 may determine the detection avoidance period based on one or more buildings that are within the detection range. Since tall infrastructures are known to impact signal propagation, the amount of time for signals to be received and/or transmitted within the detection range may increase based on an increase in density of buildings within the detection range. Based on the detection avoidance period, the signature reduction platform 127 selects one or more road segments within the detection range, where the estimated time for the vehicle 105 to traverse the one or more road segments is less than the detection avoidance period. Accordingly, the signature reduction platform 127 may generate a travel link based on the detection avoidance period, thereby optimizing estimated-time-of-arrival (ETA) while providing vehicle signature reduction.

In one embodiment, the potential adversarial source 115 may be a vehicle. Accordingly, the location of the detection range of the potential adversarial source 115 may change over time. In such embodiment, the attribute data may indicate that the potential adversarial source 115 is currently in motion and further indicate a travel link of the potential adversarial source 115 or current direction and speed at which the potential adversarial source 115 is traveling. Using the travel link or the combination of direction and speed, the signature reduction platform 127 may predict one or more future locations of the potential adversarial source 115 and the detection range thereof. Based on the prediction, the signature reduction platform 127 may generate a travel link for the vehicle 105 based on predicted future locations of potential adversarial source 115 and the detection range thereof.

In one embodiment, the signature reduction platform 127 may establish a distance (or a minimum distance) between the vehicle 105 and the potential adversarial source 115 to provide signature reduction for the vehicle 105 (will be referred as "signature reduction distance," herein). The signature reduction distance may be provided as a recommendation for an operator of the vehicle 105. Alternatively or additionally, the signature reduction distance may be used to determine driving commands for the vehicle 105 (when the vehicle 105 is autonomous or semi-autonomous). By way of example, the vehicle 105 may be controlled to drive in directions and/or speed that does not compromise the signature reduction distance. Put differently, the vehicle 105 may be controlled such that the distance between the vehicle 105 and the potential adversarial source 115 is greater than or equal to the signature reduction distance, but not less than the signature reduction distance. The signature reduction distance may be calculated based on the detection range. In one embodiment, the signature reduction distance may be calculated based further on an estimated amount of time required by the signature reduction platform 127 to find an alternate travel link and an operator of the vehicle 105 to react to the alternate travel link in an event that the potential adversarial source 115 changes direction and speed at which the potential adversarial source 115 is moving. Such amount of time may account for an amount of time that the signature reduction platform 127 requires to calculate one or more alternative road segments that does not compromise the signature reduction distance at one or more future times. In one embodiment, the signature reduction distance may be calculated based further on an estimated amount of time required by the signature reduction platform 127 to calculate the detection avoidance period for an event in which no alternative road segment can be provided.

In one embodiment, the signature reduction platform 127 may predict that: (1) the vehicle 105 will be within the detection range of the potential adversarial source 115; (2) no alternative road segment is available; and (3) the vehicle 105 will be within the detection range longer than the detection avoidance period. In such embodiment, the signature reduction platform 127 may cause the signature reduction device 113 to: (1) alter visual characteristics of the vehicle 105; (2) disable or reduce operations associated with transmitters, receivers, or a combination thereof included in the vehicle 105; (3) establish encoding/decoding model for communication between the vehicle 105 and an entity; or (4) a combination thereof.

In one embodiment, the signature reduction platform 127 may receive historical data associated with a given area (e.g., a road segment) within a map. The historical data may indicate a number of instances in which a detection range of the potential adversarial source 115 or one or more other potential adversarial sources 115 has overlapped the area within a given duration. If the number of instances for a given area exceeds a threshold value, the signature reduction platform 127 may generate or modify a travel link for the vehicle 105 that avoids said area. The signature reduction platform 127 may rely on such historical data in events where the signature reduction platform 127 fails to identify any potential adversarial source within or proximate to a travel link of the vehicle 105.

It is contemplated that, in some circumstances, the vehicle 105 may require constant communication with an entity to provide or maintain certain functions (e.g., the vehicle 105 is an autonomous vehicle and requires constant communication with a control server to receive driving commands and navigation information). In such circumstances, the potential adversarial source 115 may be able to intercept signals that are transmitted between the vehicle 105 and the entity. As such, in one embodiment, the signature reduction platform 127 may also consider a communication range of the vehicle 105 for determining a travel link that provides signature reduction for the vehicle 105. The communication range of the vehicle 105 may be defined by: (1) a maximum range at which the vehicle 105 is capable of establishing wireless communication; or (2) a maximum range at which a transmitter/receiver of the vehicle 105 is capable of establishing wireless communication, where the transmitter/receiver is used by the vehicle 105 for a given function (e.g., using dedicated short-range communications to receive navigation information). In one embodiment, the signature reduction platform 127 may modify a shape of a communication range in the same method as modifying a shape of a detection range for the potential adversarial source 115 (i.e., modifying the shape of the detection range in view of one or more obstructing factors within the detection range). In one embodiment, the signature reduction platform 127 may determine a level of detectability for one or more areas within a communication range in the same method as determining a level of detectability for one or more areas within a detection range of the potential adversarial source 115. The signature reduction platform 127 may generate the travel link such that the communication range of the vehicle 105 does not overlap with the detection range of the potential adversarial source 115. Such travel link may also take into account of future locations of the vehicle 105 and the potential adversarial source 115 and whether the communication range of the vehicle 105 overlaps the detection range of the potential adversarial source 115 at a future time. In one embodiment, the signature reduction platform 127 may generate the travel link such that one or more areas within the communication range and the detection range abut or overlap each other. In such embodiment, the one or more areas have a "low" level of detectability.

In the illustrated embodiment, the database 129 stores information on road links (e.g., road signs associated with road links, road length, road breadth, slope information, curvature information, etc.) and probe data for one or more road links (e.g., traffic density information). In one embodiment, the database 129 may include any multiple types of information that can provide means for aiding in providing signature reduction for a vehicle. It should be appreciated that the information stored in the database 129 may be acquired from any of the elements within the system 100, other vehicles, sensors, database, or a combination thereof.

In one embodiment, the UE 101, the vehicle 105, the detection entity 117, the services platform 119, the content providers 123, and the signature reduction platform 127 communicate with each other via the communication network 125 using well known, new or still developing protocols. In this context, a protocol includes a set of rules defining how the network nodes within the communication network 125 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises: (1) header information associated with a particular protocol; and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
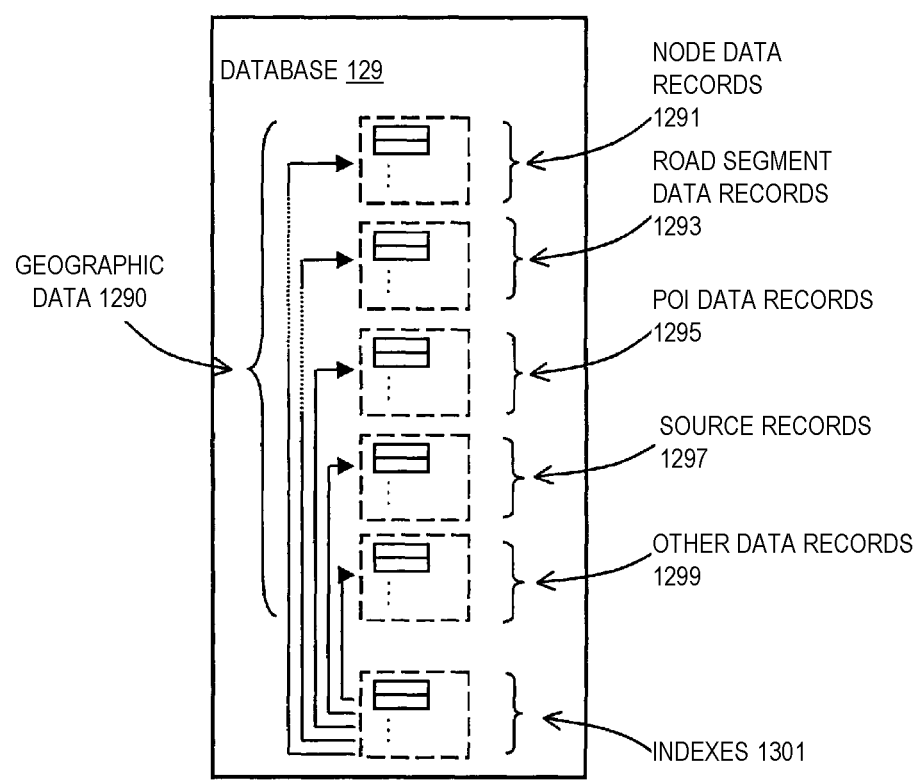
FIG. 1B illustrates a diagram of the database within the system of FIG. 1A.

FIG. 1B is a diagram of a database 129 (e.g., a map database), according to one embodiment. In one embodiment, the database 129 includes geographic data 1290 used for (or configured to be compiled to be used for) mapping and/or navigation-related services. In one embodiment, the following terminology applies to the representation of geographic features in the database 129.

a. "Node"—A point that terminates a link.
  b. "Line segment"—A straight line connecting two points.
  c. "Link" (or "edge")—A contiguous, non-branching string of one or more line segments terminating in a node at each end.

In one embodiment, the database 129 follows certain conventions. For example, links do not cross themselves and do not cross each other except at a node. Also, there are no duplicated shape points, nodes, or links. Two links that connect each other have a common node.

As shown, the database 129 includes node data records 1291, road segment or link data records 1293, point of interest (POI) data records 1295, source records 1297, other records 1299, and indexes 1301, for example. More, fewer or different data records can be provided. In one embodiment, additional data records (not shown) can include cartographic ("carto") data records, routing data, and maneuver data. In one embodiment, the indexes 1301 may improve the speed of data retrieval operations in the database 129. In one embodiment, the indexes 1301 may be used to quickly locate data without having to search every row in the database 129 every time it is accessed.

In exemplary embodiments, the road segment data records 1293 are links or segments representing roads, streets, or paths, as can be used in the calculated route or recorded route information for determination of one or more personalized routes. The node data records 1291 are end points (such as intersections) corresponding to the respective links or segments of the road segment data records 1293. The road link data records 1293 and the node data records 1291 represent a road network, such as used by vehicles, cars, and/or other entities. Alternatively, the database 129 can contain path segment and node data records or other data that represent pedestrian paths or areas in addition to or instead of the vehicle road record data, for example.

Links, segments, and nodes can be associated with attributes, such as geographic coordinates, street names, address ranges, speed limits, turn restrictions at intersections, presence of a construction work site, and other navigation related attributes, as well as POIs, such as gasoline stations, hotels, restaurants, museums, stadiums, offices, automobile dealerships, auto repair shops, stores, other buildings, parks, tunnels, etc. The database 129 can include data about the POIs and their respective locations in the POI data records 1295. The data about the POIs may include attribute data associated with the POIs such as a type of POI, a shape of POI, a dimension(s) of POI, a number of stories included in each of the POIs, one or more artificial light sources associated with the POIs (e.g., building lights), a position/orientation of the one or more artificial light sources, timing at which the one or more artificial light sources are activated, attribute associated with the one or more artificial light sources (e.g., color, intensity, etc.), etc. The database 129 can also include data about places, such as cities, towns, or other communities, and other geographic features, such as bodies of water, mountain ranges, etc. Such place or feature data can be part of the POI data records 1295 or can be associated with POIs or POI data records 1295 (such as a data point used for displaying or representing a position of a city).

In one embodiment, the database 129 can also include source records 1297. The source records 1297 may indicate at least one attribute data associated the potential adversarial source 115 or other potential adversarial sources. By way of example, said attribute may indicate a location of the potential adversarial source, physical characteristics associated with the potential adversarial source (e.g., colour, shape, size, etc.), a type of potential adversarial source, a type of sensors equipped by the potential adversarial source, a detection range of the sensors, a type of transmitter and/or receiver equipped by the potential adversarial source, a detection range of the transmitter and/or the receiver, communication protocol associated with the transmitter and/or the receiver, a detection avoidance period, a signature reduction distance, or a combination thereof.

Other records 1299 may include historical data or specification data that correlate one or more types of vehicles, buildings, stationary devices, or constructs to the potential adversarial source 115. In one embodiment, historical data may be acquired based on actual past incidents of adversarial sources acquiring data from vehicles. The specification data may be data received from a trusted source (e.g., an OEM) and indicating a specification associated with a vehicle, a stationary device, a construct, and/or a building. In one embodiment, the historical data may further correlate one or more attribute data associated with transmitters and/or receivers (e.g., transmitter/receiver type, specification, etc.) to one or more detection ranges. In one embodiment, the historical data may associate one or more obstructing factors within a detection range to one or more shapes of the detection range. By way of example, the historical data may include a past record (e.g., a field test) indicating a shape of a detection range of a transmitter within a city. In one embodiment, the historical data may include information indicating a frequency at which one or more instances has occurred within a given area in a map (e.g., a road segment), where each instance defines an event in which at least a portion of the detection range of the potential adversarial source has overlapped or abutted the area. Other records 1299 may further include mathematical models for estimating a detection range of a transmitter/receiver, a shape of the detection range, a level of detectability for one or more areas within the detection range, and a detection avoidance period. A model for estimating the detection range may be calculated as a function of specification associated with the transmitter/receiver. Models for estimating the shape of the detection range, the level of detectability, and the detection avoidance period may each be calculated as a function of the detection range and one or more obstructing factors. Other records 1299 may include data indicating one or more artificial light sources that are not associated with POIs (e.g, streetlights). Such data may indicate a position/orientation of the one or more artificial light sources, timing at which the one or more artificial light sources are activated, attribute associated with the one or more artificial light sources (e.g., color, intensity, etc.), dimensions, orientation, type, classification, etc.

In one embodiment, the database 129 can be maintained by one or more of the content providers 123 in association with a map developer. The map developer can collect geographic data 1290 to generate and enhance the database 129. There can be different ways used by the map developer to collect data. These ways can include obtaining data from other sources, such as municipalities or respective geographic authorities. In addition, the map developer can employ field personnel to travel by vehicle along roads throughout the geographic region to observe road signs and/or record information about them, for example. Also, remote sensing, such as aerial or satellite photography, can be used.

The database 129 can be a master database stored in a format that facilitates updating, maintenance, and development. For example, the master database or data in the master database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 105, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received database in a delivery format to produce one or more compiled navigation databases.

The processes described herein for providing signature reduction for a vehicle may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 2:
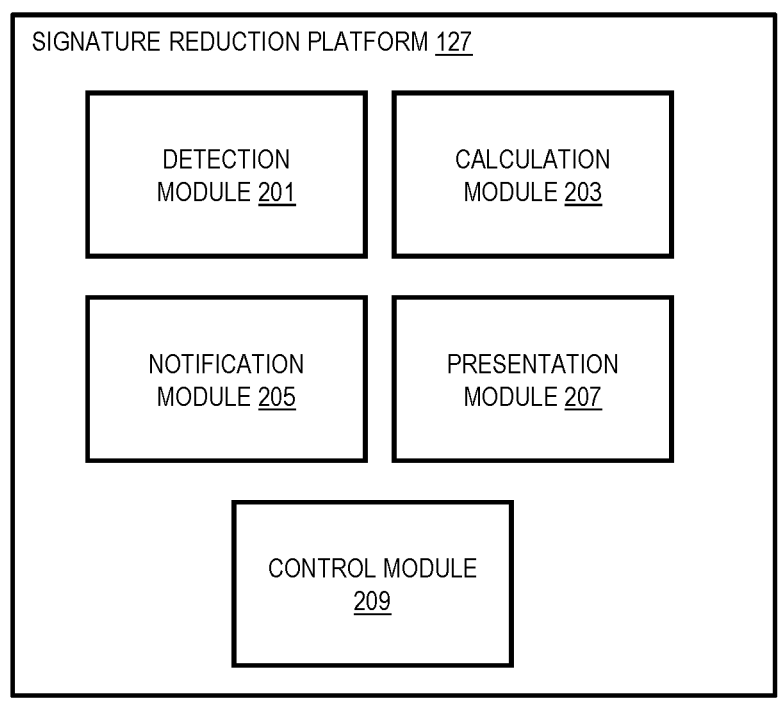
FIG. 2 illustrates a diagram of components of the signature reduction platform within the system of FIG. 1A.

FIG. 2 is a diagram of the components of the signature reduction platform 127, according to one embodiment. By way of example, the signature reduction platform 127 includes one or more components for providing signature reduction for a vehicle. It is contemplated that the functions of these components may be combined in one or more components or performed by other components of equivalent functionality. In this embodiment, the signature reduction platform 127 includes a detection module 201, a calculation module 203, a notification module 205, a presentation module 207, and a control module 209.

The detection module 201 may acquire information and/or data required for providing signature reduction for the vehicle 105. The detection module 201 may acquire, from the UE 101, a request for providing a signature reduction for the vehicle 105. In one embodiment, the detection module 201 may identify a current direction of travel for the vehicle 105 or a travel link associated with the vehicle 105. Based on the current direction of travel or the travel link, the detection module 201 may determine one or more road segments that the vehicle 105 will traverse at a future time.

The detection module 201 may identify one or more potential adversarial sources 115 proximate to the one or more road segments. In one embodiment, the detection module 201 may identify the potential adversarial source 115 via one or more source detecting devices 117 that is proximate to the one or more road segments. By way of example, the detection entity 117 may include a camera, and the camera may capture an image of the potential adversarial source 115. The detection module 201 may perform image processing to identify the potential adversarial source 115 from the image and further acquire time and location information associated with the potential adversarial source 115 based on the location of the detection entity 117 and the time at which the detection entity 117 captured the image. In one embodiment, the potential adversarial source 115 may be communicatively coupled to the communication network 125, and the detecting module 201 may acquire the time and location information associated with the potential adversarial source 115 directly from the potential adversarial source 115. In one embodiment, the potential adversarial source 115 may be a stationary entity, and the database 129 may store location information associated with the potential adversarial source 115. In such embodiment, the detection module 201 may acquire the location information associated with the potential adversarial source directly from the database 129.

For each potential adversarial sources 115, the detection module 201 may acquire attribute data associated with said potential adversarial source 115. The attribute data may be acquired via the vehicle 105, the potential adversarial source 115, the detection entity 117, the database 129, or a combination thereof. The attribute data may indicate spatial information associated with the potential adversarial source (e.g., speed/heading of the potential adversarial source, a travel link of the potential adversarial source, etc.), a type of potential adversarial source (e.g., vehicle, building, street sensor, etc.), physical characteristics of the potential adversarial source (e.g., size, dimension, color, etc.), type of equipped sensors, number of sensors, orientation of the sensors, detection range of the sensors, other sensor-related specifications, or a combination thereof. In one embodiment, the attribute data may include one or more non-sensor-related attribute data. In such embodiment, the detection module 201 may derive sensor-related attribute data based on the non-sensor-related attribute data. By way of example, the detection module 201 may acquire a non-sensor-related attribute data, such as data indicating a type of vehicle. The detection module 201 may acquire vehicle specification associated with the type of vehicle and derive sensor-related attribute data, such as a type of sensor and sensor specification, based on the vehicle specification. In such example, a detection range of the sensors may be further derived from the sensor specification. Using the attribute data, the calculation module 203 determines the detection range associated with each potential adversarial source 115. Once the detection range is identified, the detection module 201 acquires information associated with one or more obstructing factors that are within the detection range. If the potential adversarial source 115 is a vehicle and is currently moving, the detection module 201 may further acquire information associated with one or more obstructing factors that is within one or more detection ranges at one or more road segments of which the potential adversarial source 115 has yet to traverse. Information associated with obstructing factors may be: (1) physical objects within the detection range (e.g., buildings, type of buildings, density of buildings, size of buildings, etc.); (2) a weather condition affecting an area within the detection range (e.g., type of weather, magnitude of weather, etc.); (3) a physical environment within the detection range (e.g., mountains, tunnels, trees, etc.); (4) lighting within the detection range (e.g., day or night time, amount of artificial lights within the detection range, etc.); or (5) a combination thereof. The detection module 201 may acquire such information from the detection entity 117, the services platform 119, one or more of the content providers 123, the database 129, or a combination thereof.

In one embodiment, the detection module 201 may identify whether one or more road segments is currently abutting or within one or more detection ranges of the potential adversarial source 115 and/or whether one or more road segment will abut or be within one or more detection ranges of the potential adversarial source 115 at one or more future times.

In one embodiment, the detection module 201 may identify an ETA for the vehicle 105 to traverse one or more road segments, which may be used to by the calculation module 203 for comparison with a detection avoidance period of a detection range and selection of one or more road segments. The detection module 201 may also calculate an ETA of the potential adversarial source 115, thereby enabling the calculation module 203 to which road segment(s) will be affected by the detection range at one or more future times. It should be appreciated that an estimation of an ETA for a given road segment may be calculated based on: (1) current speed of the vehicle; (2) traffic information associated with the road segment; and (3) historical data associated with the road segment (e.g., historical ETA, historical traffic information, etc.).

The calculation module 203 may acquire the attribute data from the detection module 201 to calculate the detection range of the potential adversarial source 115. Specifically, in scenarios where the database 129 does not store information related to a detection range, the calculation module 203 may estimate the detection range as a function of a type of sensor and specification associated with the type of sensor. In one embodiment, the calculation of the detection range may be rendered assuming that there is no obstructing factors affecting the detection range.

In one embodiment, the calculation module 203 may determine one or more obstructing factors using the information acquired by the detection module 201. By way of example, the calculation module 203 may calculate a size, dimension, orientation at which a building is facing the vehicle 105. By way of another example, the calculation module 203 may calculate a distance at which the building is positioned with respect to the vehicle 105. Such calculation may be used to determine the shape of the detection range and/or the level of detectability associated with the detection range. By way of another example, the calculation module 203 may determine a degree of light available within an area of a map (e.g., sun angle, number of activate artificial light source within the area, etc.), thereby enabling the calculation module 203 to further determine the level of detectability based on the degree of light.

Figure 3A:
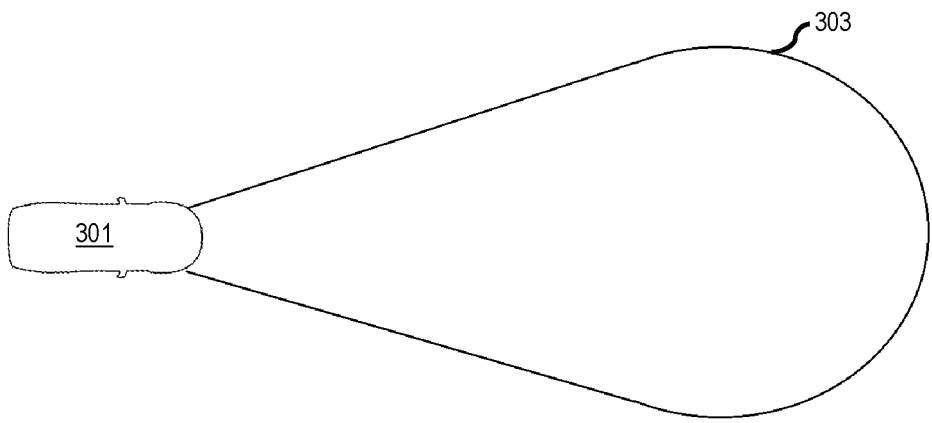
FIG. 3A illustrates a first example model including a detection range that is not affected by an obstructing factor.
Figure 3B:
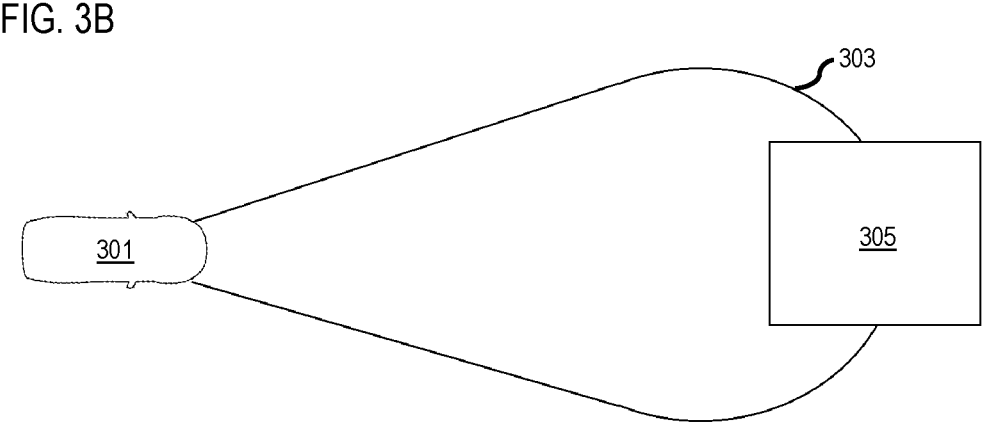
FIG. 3B illustrates the first example model including the detection range that is affected by an obstructing factor.

In one embodiment, the calculation module 203 may receive information associated with obstructing factors and modify the detection range based on the obstructing factors. By way of example, FIG. 3A illustrates a first example model including a detection range that is not affected by an obstructing factor. In the illustrated example, the potential adversarial source 115 is a potential adversarial vehicle 301 equipped with a front-facing camera, and the calculation module 203 has determined a detection range 303 of the front-facing camera. FIG. 3B illustrates the first example model including the detection range that is affected by an obstructing factor. In the illustrated example, the calculation module 203 has determined that the obstructing factor is a construct 305 located in front of the potential adversarial vehicle 301. The construct 305 may be a building, a spire, a series of walls, a barrier, etc. Based on the shape and location of the construct 305, the shape of the detection range 303 has been modified by the calculation module 203.

Figure 4A:
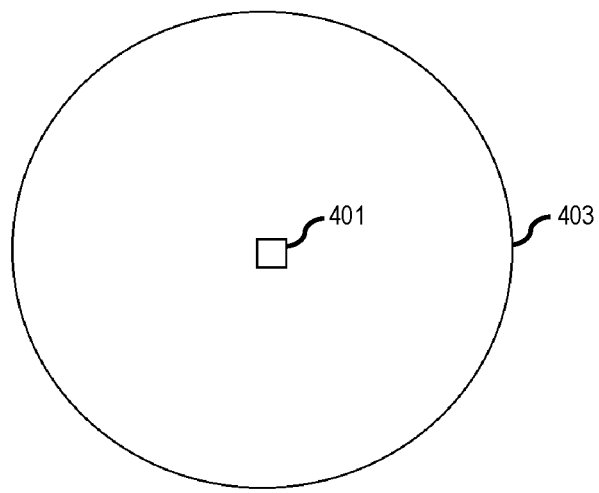
FIG. 4A illustrates a second example model including a detection range that is not affected by an obstructing factor.
Figure 4B:
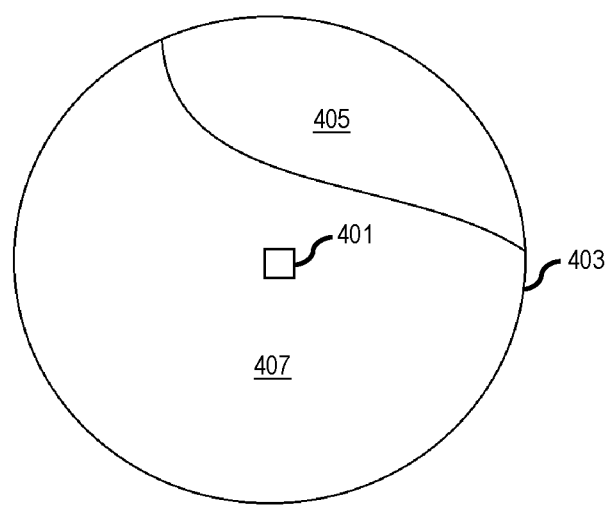
FIG. 4B illustrates the second example model including the detection range that is affected by an obstructing factor.

In one embodiment, the calculation module 203 may use the information associated with obstructing factors and assign a level of detectability for one or more areas within the detection range based on the information. By way of example, FIG. 4A illustrates a second example model including a detection range that is not affected by an obstructing factor. In the illustrated example, the potential adversarial source 115 is a potential adversarial construct 401 equipped with a transmitter/receiver. The construct 305 may be a building, a spire, a series of walls, a barrier, etc. In the illustrated example, the calculation module 203 has determined a detection range 403 of the transmitter/receiver and assigned the level of detectability for the detection range 403 as a "high" level. FIG. 4B illustrates the second example model including the detection that is affected by an obstructing factor. In the illustrated example, the calculation module 203 has determined that the obstructing factor is a presence of an area 405 within the detection range 403. The area includes signal obstructing objects (e.g., forest, buildings, etc.) that impact signal propagating from the transmitter/receiver. The calculation module 203 has assigned the level of detectability for the area 405 as a "low" level; whereas, the calculation module 203 has assigned the level of detectability for the remaining area 407 of the detection range 403 as a "high" level. In one embodiment, an area having a "low" level of detectability may indicate that the calculation module 203 is uncertain whether the potential adversarial source 115 is capable of acquiring signature information from a vehicle within the area. In one embodiment, an area having a "low" level of detectability may indicate that the potential adversarial source 115 is not capable of acquiring signature information from a vehicle within the area. In one embodiment, a level of detectability for an area may indicate a likelihood of which the potential adversarial source 115 is capable of acquiring signature information from a vehicle within the area.

In one embodiment, the calculation module 203 may calculate a detection avoidance period. By way of example, the attribute data associated with the potential adversarial source 105 may indicate a type of transceiver equipped by the potential adversarial source 105 and a communication protocol associated with the transceiver. Based on the type and the communication protocol, the signature reduction platform 127 may identify the detection avoidance period. In one embodiment, the calculation module 203 may calculate the detection avoidance period based on one or more obstructing factors. By way of example, the calculation module 203 may determine the detection avoidance period based on one or more buildings that are within the detection range. Since tall infrastructures are known to impact signal propagation, the amount of time for the signals received and/or transmitted within the detection range may increase based on an increase in density of buildings within the detection range. Since obstructing factors may affect a portion of the detection range, rather than the entire detection range, the detection avoidance period for one area within the detection range may be different that the detection avoidance period for another area within the detection range.

In one embodiment, the calculation module 203 acquires historical data associated with a given area (e.g., a road segment) within a map. The historical data may indicate a number of instances in which a detection range of the potential adversarial source 115 or one or more other potential adversarial sources 115 has overlapped the area within a given duration. The calculation module 203 may compare the number of instances to a threshold value and generate a travel link based at least in part on the comparison.

In one embodiment, the calculation module 203 may determine a signature reduction distance based on the detection range. In one embodiment, the signature reduction distance may be calculated based further on an estimated amount of time required by the calculation module 203 to find an alternate travel link and an operator of the vehicle 105 to react to the alternate travel link in an event that the potential adversarial source 115 changes its direction and speed of travel. Such amount of time may account for an amount of time that the calculation module 203 requires to calculate one or more alternative road segments that does not compromise the signature reduction distance at one or more future times. In one embodiment, the signature reduction distance may be calculated based further on an estimated amount of time required by the calculation module 203 to calculate the detection avoidance period for an event in which no alternative road segment can be provided. Both estimated amounts of time may be determined based on historical data indicating past records for determining said estimate amounts of time.

The calculation module 203 may generate a travel link or an alternative travel link including one or more different road segments. In one embodiment, the calculation module 203 may generate a travel link such that the travel link completely avoids the detection range. In one embodiment, the calculation module 203 may calculate an ETA of one or more road segments within the detection range, and if the ETA is lower than the detection avoidance period associated with detection range, the calculation module may select the one or more road segments as at least a part of the travel link. In one embodiment, if the detection range includes one or more areas having a "low" level of detectability, the calculation module 203 may select one or more road segments that are abutting or within the one or more areas as at least a part of the travel link. In one embodiment, if the number of instances in which the detection range of the potential adversarial source 115 or one or more other potential adversarial sources 115 has overlapped or abutted an area of a map within a given duration exceeds a threshold value, the calculation module 203 may exclude one or more road segments that are abutting or within the area as any part of the travel link. In one embodiment, the calculation module 203 may generate a travel link such that a signature reduction distance is not compromised at any point and time while the vehicle 105 traverses the travel link.

in one embodiment, the calculation module 203 determining a travel link that provides signature reduction for the vehicle 105 based on a communication range of the vehicle 105 for. The communication range of the vehicle 105 may be defined by: (1) a maximum range at which the vehicle 105 is capable of establishing wireless communication; or (2) a maximum range at which a transmitter/receiver of the vehicle 105 is capable of establishing wireless communication, where the transmitter/receiver is used by the vehicle 105 for a given function (e.g., using dedicated short-range communications to receive navigation information). In one embodiment, the calculation module 203 may modify a shape of a communication range in the same method as modifying a shape of a detection range for the potential adversarial source 115 (i.e., modifying the shape of the detection range in view of one or more obstructing factors within the detection range). In one embodiment, the calculation module 203 may determine a level of detectability for one or more areas within a communication range in the same method as determining a level of detectability for one or more areas within a detection range of the potential adversarial source 115. The calculation module 203 may generate the travel link such that the communication range of the vehicle 105 does not overlap with the detection range of the potential adversarial source 115. Such travel link may also take into account of future locations of the vehicle 105 and the potential adversarial source 115 and whether the communication range of the vehicle 105 overlaps the detection range of the potential adversarial source 115 at a future time. In one embodiment, the calculation module 203 may generate the travel link such that one or more areas within the communication range and the detection range abut or overlap each other. In such embodiment, the one or more areas have a "low" level of detectability.

The notification module 205 may cause a notification to the UE 101 regarding various information associated with vehicle signature reduction. In one embodiment, the notification may indicate a location of the potential adversarial source 115, attribute data associated with the potential adversarial source 115 (e.g., type of potential adversarial source, type of sensors/transmitters/receivers equipped by the potential adversarial source, etc.), a detection range of the potential adversarial source 115, a communication range of the vehicle 105, one or more obstructing factors associated with the detection range, a shape of the detection range affected by an obstructing factor, a level of detectability for one or more areas within the detection range, historical data associated with one or more road segments, a detection avoidance period associated with the detection range, a signature reduction distance, a travel link providing the signature reduction, or a combination thereof. The notification may include sound notification, display notification, vibration, or a combination thereof.

The presentation module 207 obtains a set of information, data, and/or calculated results from other modules, and continues with providing a presentation of a visual representation to the UE 101. The visual representation may include one or more symbols or models indicating a location of the potential adversarial source 115, attribute data associated with the potential adversarial source 115, a detection range of the potential adversarial source 115, a communication range of the vehicle 105, one or more obstructing factors associated with the detection range, a shape of the detection range affected by an obstructing factor, a level of detectability for one or more areas within the detection range, historical data associated with one or more road segments, a detection avoidance period associated with the detection range, a signature reduction distance, a travel link providing the signature reduction, or a combination thereof. In one embodiment, the presentation module 207 may generate a map layer including any of the information presented by the visual representation. The map layer may include one or more elements that resembles states of any of said visual representations in real-time or future time.

In one embodiment, the control module 209 may provide commands for controlling autonomous vehicles, such as the vehicle 105, and/or information facilitating control of one or more autonomous vehicles. By way of example, the control module 209 may cause an autonomous vehicle (e.g., vehicle 105) that is requesting signature reduction to traverse a travel link output by the calculation module 203. The autonomous vehicle may traverse the travel link such that the vehicle: (1) avoids one or more detection ranges; (2) traverses one or more detection ranges based on one or more detection avoidance periods associated therewith; or (3) moves with respect to the potential adversarial source 115 at a speed and direction that does not compromise a signature reduction distance. In one embodiment, if the calculation module 203 determines that: (1) the vehicle 105 will be within the detection range of the potential adversarial source 115; (2) no alternative road segment is available; and (3) the vehicle 105 will be within the detection range longer than the detection avoidance period, the control module 209 may cause the signature reduction device 113 to: (1) alter visual characteristics of the vehicle 105; (2) disable or reduce operations associated with transmitters, receivers, or a combination thereof included in the vehicle 105; (3) establish encoding/decoding model for communication between the vehicle 105 and an entity; or (4) a combination thereof. Alternatively, if the vehicle 105 requires constant communication with an entity, the vehicle 105 may be controlled to stop and disable or reduce the operations associated with the transmitters, the receivers, or the combination thereof included in the vehicle 105 until the vehicle 105 is outside the detection range.

The above presented modules and components of the signature reduction platform 127 can be implemented in hardware, firmware, software, or a combination thereof. Though depicted as a separate entity in FIG. 2, it is contemplated that the signature reduction platform 127 may be implemented for direct operation by the UE 101, the vehicle 105, the services platform 215, one or more of the content providers 219, or a combination thereof. As such, the signature reduction platform 127 may generate direct signal inputs by way of the operating system of the UE 101, the vehicle 105, the services platform 215, the one or more of the content providers 219, or the combination thereof for interacting with the applications 103. The various executions presented herein contemplate any and all arrangements and models.

FIGS. 5A-5E illustrate example displays 500a-500e presenting example scenarios associated the vehicle 105 of FIG. 1A. The example displays 500a-500e may be generated via the signature reduction platform 127 of FIG. 1A. The example displays 500a-500e may be presented on the UE 101 of FIG. 1A or other display devices associated with the vehicle 105.

Figure 5A:
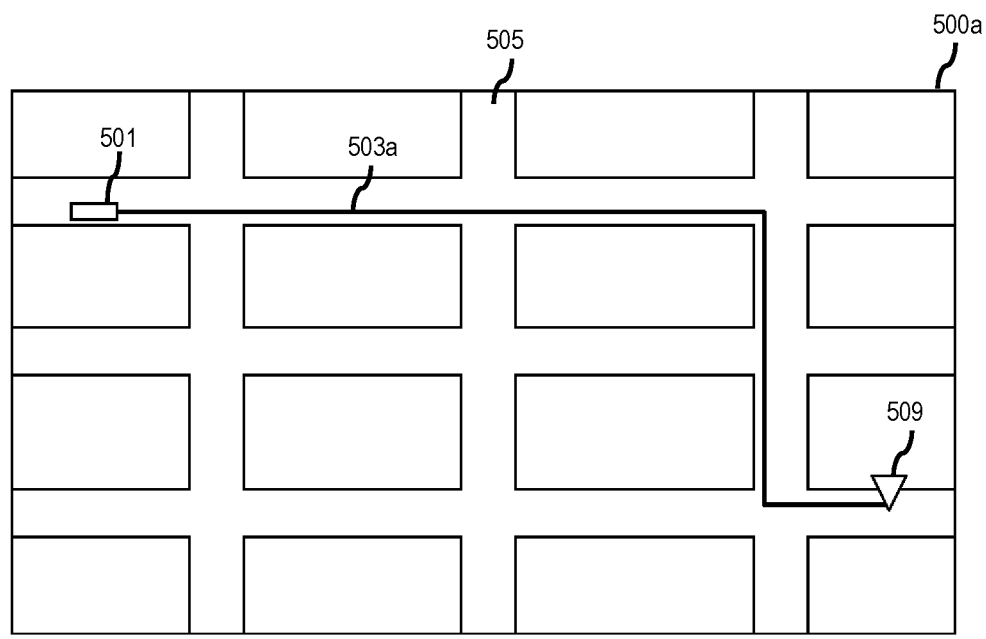
FIGS. 5A-5E illustrate example displays presenting example scenarios associated with the vehicle of FIG. 1A.

Turning to FIG. 5A, a first example display 500a includes a vehicle model 501 representing the vehicle 105, a first travel link 503a of the vehicle 105, a plurality of road segments 505, and a destination 509. The first display 500a represents a scenario in which the signature reduction platform 127 has not detected any potential adversarial source 115 within a proximity of the vehicle 105 and the proximity of the travel link 503a.

Figure 5B:
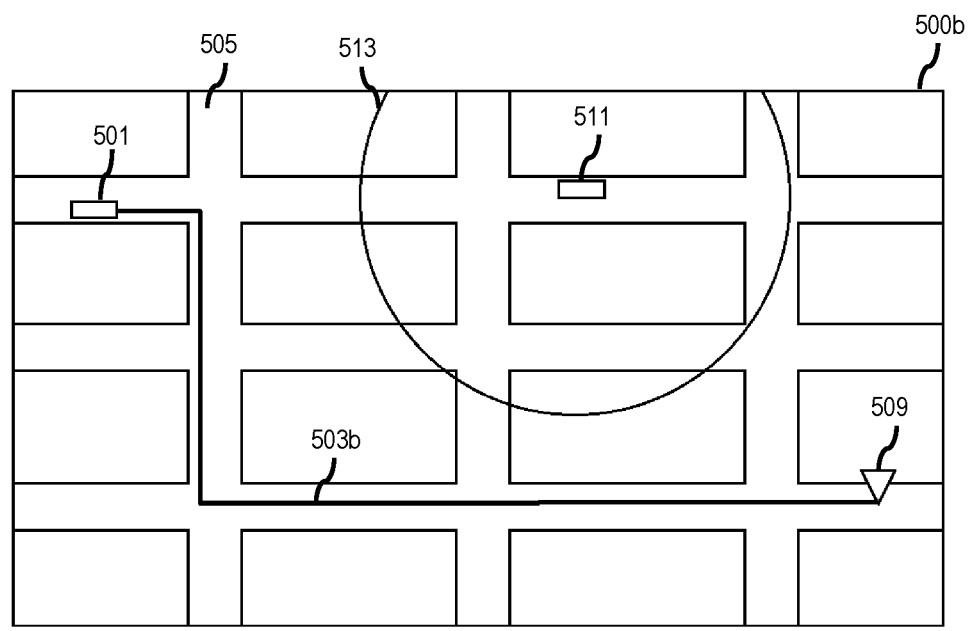

In FIG. 5B, a second example display 500b includes the vehicle model 501, a second travel link 503b of the vehicle 105, the plurality of road segments 505, the destination 509, a second vehicle 511 representing a potential adversarial source 115, and a detection range 513 of the second vehicle 511. The second display 500b represents a scenario in which the signature reduction platform 127 has detected a potential adversarial source 115 (i.e., the second vehicle 511) and generated the detection range 513 associated with the potential adversarial source 115. In the illustrated embodiment, the signature reduction platform 127 has determined that the second vehicle 511 will be stationary for a predetermined amount of time and generated the second travel link 503b such that the second travel link 503b completely avoids the detection range 513.

Figure 5C:
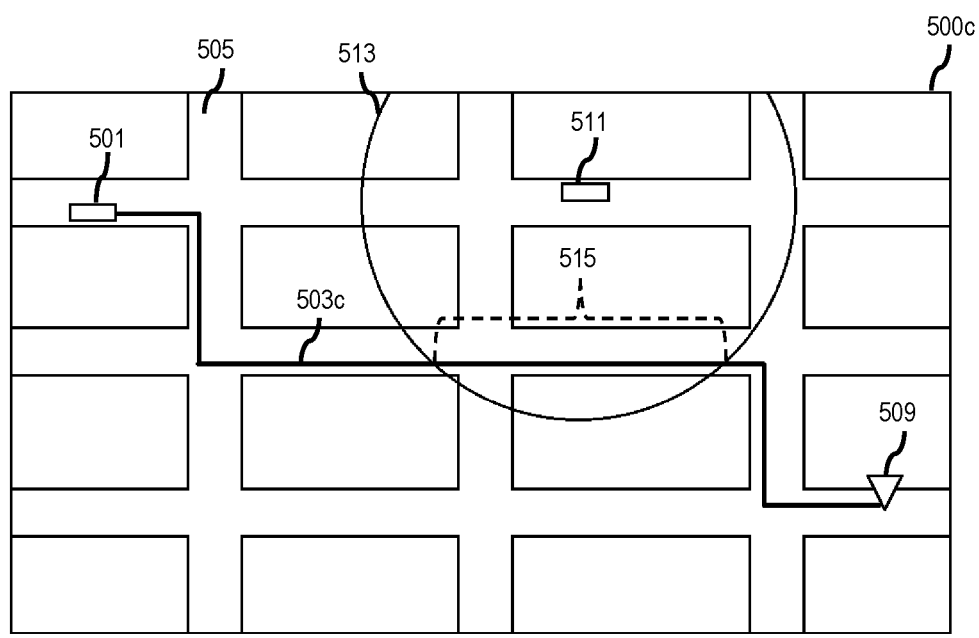

In FIG. 5C, a third example display 500c includes the vehicle model 501, a third travel link 503c of the vehicle 105, the plurality of road segments 505, the destination 509, the second vehicle 511, and the detection range 513. The third display 500c represents a scenario in which the signature reduction platform 127 has: (1) determined the detection avoidance period associated the detection range; (2) identified one or more road segments (and/or at least a portion of a road segment) having an ETA for the vehicle 105 that is lower than the detection avoidance period; and (3) selected the one or more road segment 515 as part of the travel link 503c. In this scenario, the third travel link 503c has a lower overall ETA than the second travel link 503b. Since a travel link that is determined based on a detection avoidance period may provide a lower overall ETA, a vehicle may reach a destination quicker, thereby improving user experience.

Figure 5D:
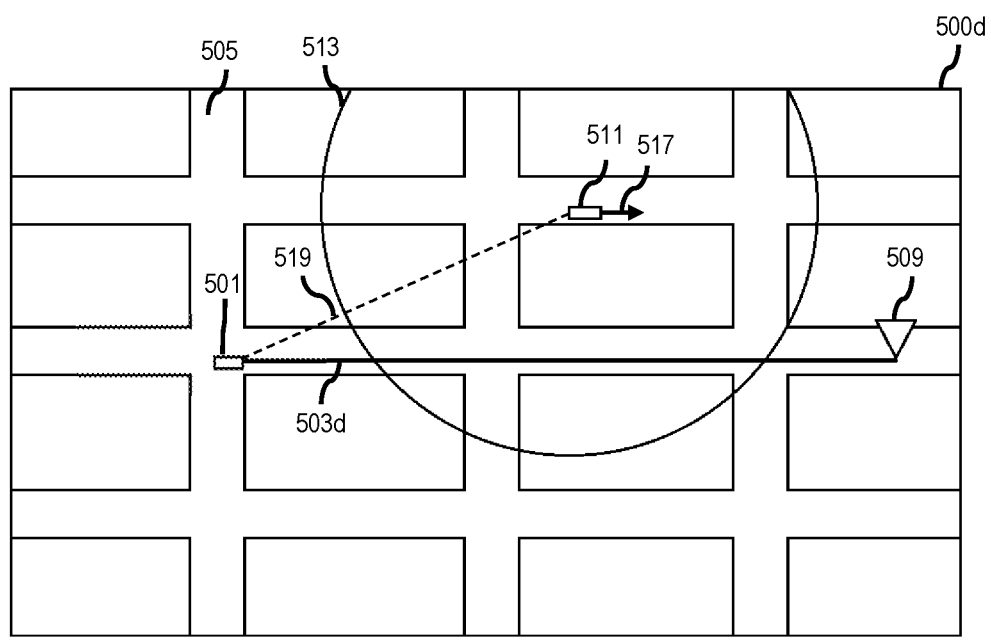

In FIG. 5D, a fourth example display 500d includes the vehicle model 501, a fourth travel link 503d of the vehicle 105, the plurality of road segments 505, the destination 509, the second vehicle 511, the detection range 513, a heading 517 of the second vehicle 511, and a signature reduction distance 519. The fourth display 500d represents a scenario in which the signature reduction platform 127 has: (1) generated the signature reduction distance 519 as a function of the detection range 513 and an amount of time required by the signature reduction platform 127 to calculate an alternate route and/or a detection avoidance period; (2) determined the speed and the heading of the second vehicle 511; and (3) generated the fourth travel link 503d as a function of the signature reduction distance 519 and the heading 517 of the second vehicle 511. In this scenario, the signature reduction distance 519 is greater than the detection range 513 such that an ample of amount of time is provided for: (1) the signature reduction platform 127 to calculate an alternate route and/or a detection avoidance period; and (2) an operator of the vehicle 105 to react to the alternate route in case the second vehicle 511 alters the heading 517. It is contemplated that in certain embodiments, a travel link, such as the fourth travel link 503d, is not generated; rather, a signature reduction distance, such as the signature reduction distance 517, is presented to a driver, such that the driver uses the signature reduction distance as a guide and chooses his/her own route to reach a destination. In this scenario, the signature reduction platform 127 has determined that the speed and heading of the vehicle 105 and the second vehicle 511 are substantially similar. As such, the signature reduction platform 127 has estimated that the signature reduction distance 519 will not be compromised during the entire period of which the vehicle 105 traverses the fourth travel link 503d.

Figure 5E:
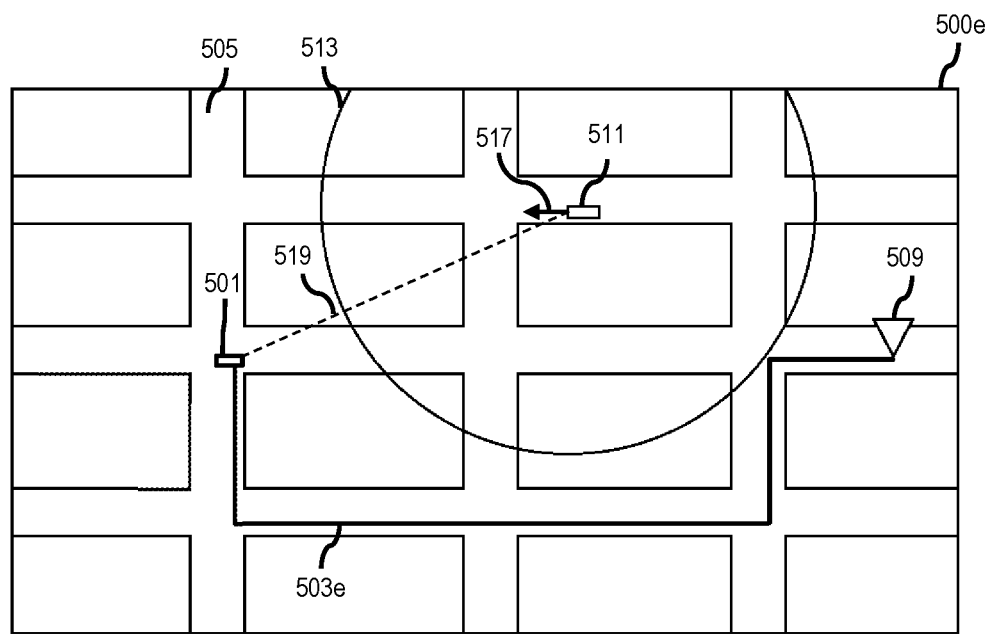

In FIG. 5E, a fifth example display 500e includes the vehicle model 501, a fifth travel link 503e of the vehicle 105, the plurality of road segments 505, the destination 509, the second vehicle 511, the detection range 513, a heading 517 of the second vehicle 511, and a signature reduction distance 519. The fifth display 500e represents a scenario in which the signature reduction platform 127 has: (1) detected that the heading 517 of the second vehicle 511 has reversed; and (2) generated the fifth travel link 503e (i.e., an alternate travel link with respect to the fourth travel link 503d). In this scenario, the fifth travel link 503e is generated such that the signature reduction distance 519 is not compromised at any point along the first travel link 503e, thereby ensuring that signature reduction for the vehicle 105 is maintained throughout the entire trip thereof.

Figure 6:
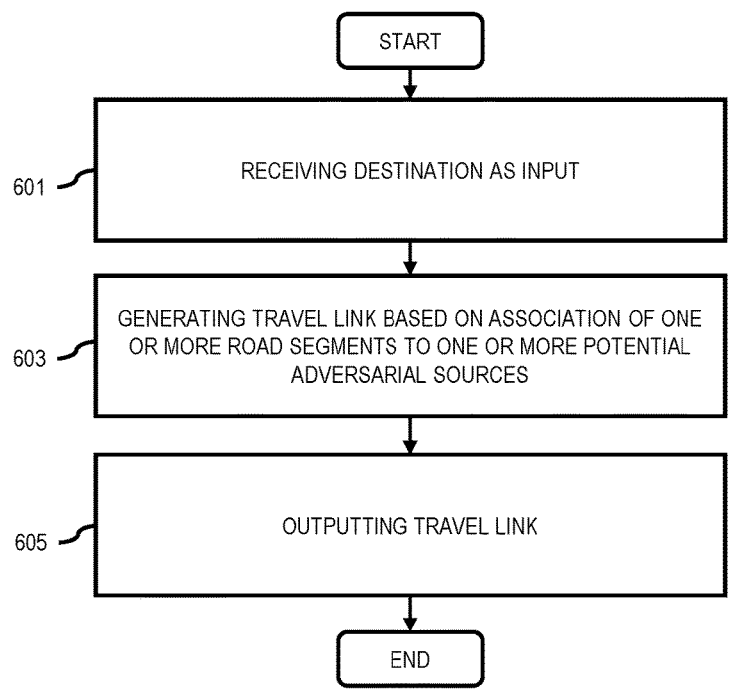
FIG. 6 illustrates a flowchart of a process for determining a travel link for providing signature reduction for a vehicle.
Figure 10:
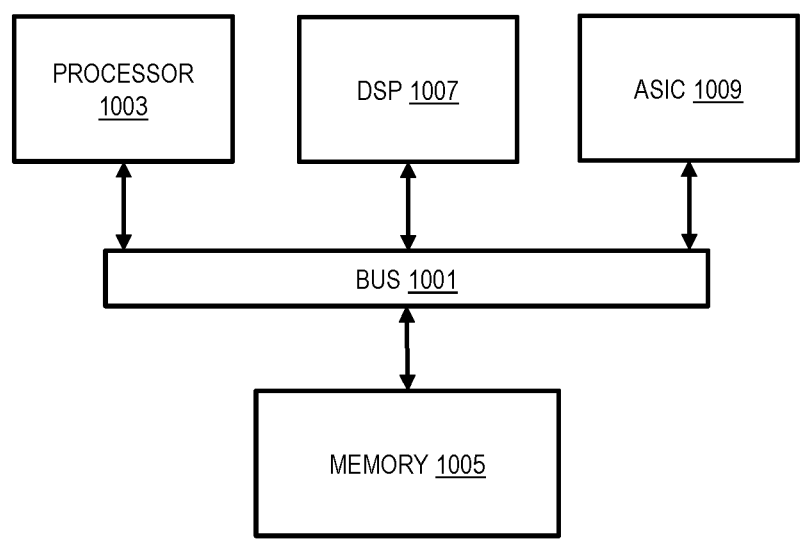
FIG. 10 illustrates a chip set or chip upon which an embodiment may be implemented.

FIG. 6 is a flowchart of a process 600 for determining a route or travel link for providing signature reduction for a vehicle, according to one embodiment. In one embodiment, the signature reduction platform 127 performs the process 600 and is implemented in, for instance, a chip set including a processor and a memory as shown in FIG. 10.

In step 601, the signature reduction platform 127 receives destination as input. The input may be provided via the UE 101 and/or other user devices associated with the vehicle 105. The input may be a request for the signature reduction platform 127 to provide a travel link to the destination.

In step 603, the signature reduction platform 127 generates the route or travel link based on association of one or more road segments to one or more potential adversarial sources 115. To identify the association of one or more road segments to the potential adversarial source 115, the signature reduction platform 127 acquires location information associated with the potential adversarial source 115. Further, the signature reduction platform 127 may assign a detection range associated with the potential adversarial source 115.

The signature reduction platform 127 may determine the detection range based on at least one attribute data associated with the potential adversarial source 115. The attribute data may indicate spatial information associated with the potential adversarial source (e.g., location of a potential adversarial source, speed/heading of the potential adversarial source, a travel link of the potential adversarial source, etc.), a type of potential adversarial source (e.g., vehicle, building, street sensor, etc.), physical characteristics of the potential adversarial source (e.g., size, dimension, color, etc.), type of equipped sensors, number of sensors, orientation of the sensors, detection range of the sensors, other sensor-related specifications, or a combination thereof. the signature reduction platform 127 may identify one or more obstructing factors that define objects or environmental factors affecting the detection range of the potential adversarial source 115 and modify the detection range based on the obstructing factors. The signature reduction platform 127 may modify a shape of the detection range based on the obstructing factor. the signature reduction platform 127 may also assign a level of detectability for one or more areas within the detection range based on the obstructing factor. the signature reduction platform 127 may also identify a detection avoidance period of the detection range. The signature reduction platform 127 may receive historical data associated with a given area (e.g., a road segment) within a map. The historical data may indicate a number of instances in which a detection range of the potential adversarial source 115 or one or more other potential adversarial sources 115 has overlapped the area within a given duration. Once the detection range is determined, the signature reduction platform 127 may select one or more road segments from the database 129 as the travel link based on the association of the one or more road segments with respect to the potential adversarial source 115. The association may indicate: (1) whether a road segment that is currently abutting or is currently overlapped by the detection range; (2) whether the road segment will abut or will become overlapped by the detection range at a future time; (3) information regarding the detection avoidance period; (4) information regarding one or more areas within the detection range having a level of detectability; (5) historical data associated with one or more areas within a map network; or (6) a combination thereof. The signature reduction platform 127 may generate the travel link such that: (1) the travel link completely avoids the detection range; (2) the travel link includes one or more portions overlapped by or abutted by the detection range, where the ETA to traverse the one or more portions by the vehicle 105 is less than the detection avoidance period; (3) the travel link avoids or includes one or more areas within the detection range having a certain level of detectability; (4) the travel link avoids one or more areas within a map network that is associated with certain historical data (e.g., instances of one or more detection ranges of one or more potential adversarial sources that has abutted or overlapped the one or more areas within a duration exceed a threshold value); or (5) a combination thereof.

In step 605, the signature reduction platform 127 outputs the route or travel link or portion thereof to the UE 101 and/or other user devices associated with the vehicle 105. The travel link may be outputted such that a display device of the UE 101 displays the travel link for an operator of the vehicle 105. Additionally or alternatively, the travel link may be used to control the vehicle 105 to move to the destination autonomously.

Figure 7:
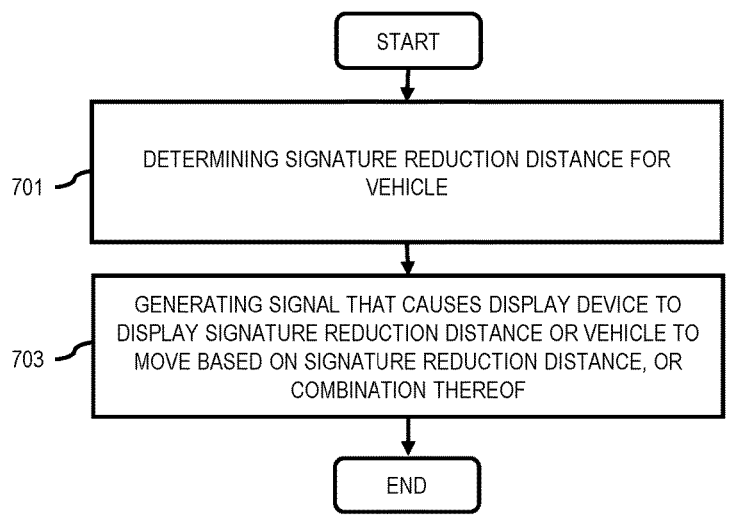
FIG. 7 illustrates a flowchart of a process for establishing a range for providing signature reduction for a vehicle.

FIG. 7 is a flowchart of a process 700 for establishing a range for providing signature reduction for a vehicle, according to one embodiment. In one embodiment, the signature reduction platform 127 performs the process 600 and is implemented in, for instance, a chip set including a processor and a memory as shown in FIG. 10.

In step 701, the signature reduction platform 127 determines a signature reduction distance for a vehicle (e.g., vehicle 105). The signature reduction distance is a distance (or a minimum distance) between the vehicle 105 and the potential adversarial source 115. Such distance ensures that signature reduction is provided for the vehicle 105. The signature reduction distance may be calculated based on the detection range. The signature reduction distance may be calculated based further on an estimated amount of time required by the signature reduction platform 127 to find an alternate travel link and an operator of the vehicle 105 to react to the alternate travel link in an event that the potential adversarial source 115 changes its direction and speed of travel. Such amount of time may account for an amount of time that the signature reduction platform 127 requires to calculate one or more alternative road segments that does not compromise the signature reduction distance at one or more future times. In one embodiment, the signature reduction distance may be calculated based further on an estimated amount of time required by the signature reduction platform 127 to calculate the detection avoidance period for an event in which no alternative road segment can be provided.

In step 703, the signature reduction platform 127 generates a signal that causes a display device, such as that of the UE 101 or other user devices associated with the vehicle 105, to display the signature reduction distance. The signature reduction distance may be provided on a map display or a navigation display as an indicator, thereby assisting an operator of the vehicle 105 to maintain signature reduction throughout the course of the trip for the vehicle 105. Additionally or alternatively, the signal causes the vehicle 105 to move autonomously based on the signature reduction distance. Specifically, the vehicle 105 may be caused to move autonomously such that a distance between the vehicle 105 and the potential adversarial source 115 is greater than or equal to the signature reduction distance throughout the course of the trip for the vehicle 105.

Figure 8:
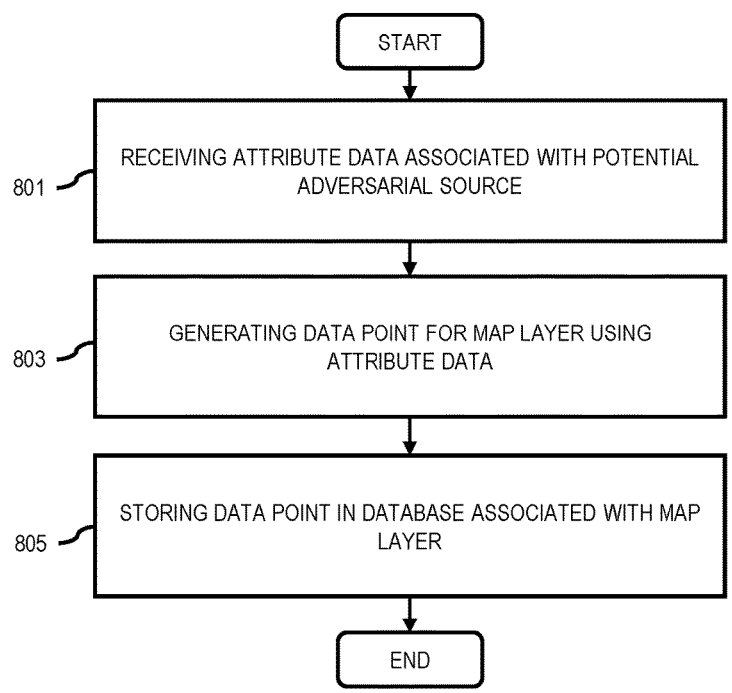
FIG. 8 illustrates a flowchart of a process for updating a map layer for providing vehicle signature reduction.

FIG. 8 is a flowchart of a process 800 for updating a map layer for providing vehicle signature reduction, according to one embodiment. In one embodiment, the signature reduction platform 127 performs the process 800 and is implemented in, for instance, a chip set including a processor and a memory as shown in FIG. 10.

In step 801, the signature reduction platform 127 receives attribute data associated with potential adversarial source 115. The attribute data may indicate spatial information associated with the potential adversarial source (e.g., speed/heading of the potential adversarial source, a travel link of the potential adversarial source, etc.), a type of potential adversarial source (e.g., vehicle, building, street sensor, etc.), physical characteristics of the potential adversarial source (e.g., size, dimension, color, etc.), type of equipped sensors, number of sensors, orientation of the sensors, detection range of the sensors, other sensor-related specifications, or a combination thereof. The signature reduction platform 127 may receive the attribute data from the vehicle 105, the potential adversarial source 115, the detection entity 117, the database 129, or a combination thereof. In one embodiment, the attribute data may be derived from sensor data. By way of example, the detection entity 117 may be equipped with a camera and acquire images including one or more physical characteristics of the potential adversarial source 115 using the camera. Image processing may be performed on the one or more images such that attribute data associated with the potential adversarial source 115 are derived from the one or more images.

In step 803, the signature reduction platform 127 generates a data point for a map layer using the attribute data. The data point indicates at least the location of the potential adversarial source 115. In one embodiment, the data point may further indicate other information regarding the potential adversarial source 115, such as speed/heading of the potential adversarial source, a travel link of the potential adversarial source, a type of potential adversarial source (e.g., vehicle, building, street sensor, etc.), physical characteristics of the potential adversarial source (e.g., size, dimension, color, etc.), type of equipped sensors, number of sensors, orientation of the sensors, detection range of the sensors, other sensor-related specifications, etc. The data point may also indicate other data, such as one or more obstructing factors within the detection range, a detection avoidance period, a level of detectability for a given area within the detection range, etc.

In step 805, the signature reduction platform 127 stores the data point in the database 129. The data point may be integrated into the map layer. The map layer may include one or more other data points indicating location of one or more other potential adversarial sources within a map. As such, when the signature reduction platform 127 receives a request for providing signature reduction for a vehicle, the signature reduction platform 127 refers to the map layer to generate a travel link.

The system, apparatus, and methods described herein enable a map-based server/platform to provide a travel link that provides signature reduction for a vehicle based on one or more detection ranges of one or more potential adversarial sources, thereby decreasing the likelihood of an actual adversarial source from acquiring vehicle signature information from the vehicle while the vehicle traverses to its destination. Further, the system, apparatus, and methods described herein enable a map-based server/platform to generate at least a portion of a travel link based on a detection avoidance period, thereby enabling the vehicle to quickly traverse the travel link while maintaining signature reduction. Additionally, the system, apparatus, and methods described herein enable a map-based server/platform to provide a travel link based on historical data indicating association of one or more road segments with one or more potential adversarial sources, thereby improving user's confidence of vehicle signature reduction even when no potential adversarial sources are detected within a map.

The processes described herein may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
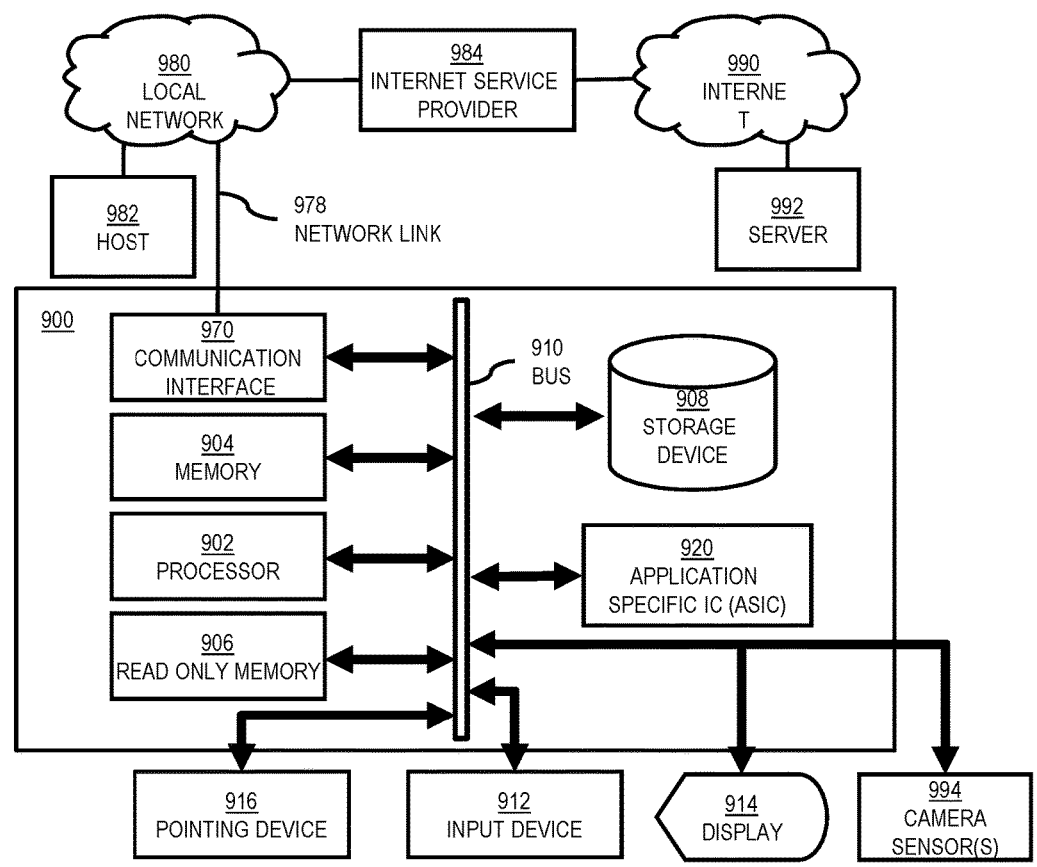
FIG. 9 illustrates a computer system upon which an embodiment may be implemented.

FIG. 9 illustrates a computer system 900 upon which an embodiment may be implemented. Although computer system 900 is depicted with respect to a particular device or equipment, it is contemplated that other devices or equipment (e.g., network elements, servers, etc.) within FIG. 8 can deploy the illustrated hardware and components of system 900. Computer system 900 is programmed (e.g., via computer program code or instructions) to provide vehicle signature reduction based on location of one or more potential adversarial sources as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for providing vehicle signature reduction based on location of one or more potential adversarial sources.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to providing vehicle signature reduction based on location of one or more potential adversarial sources. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 900 also includes a memory 904 coupled to bus 910. The memory 904, such as a random access memory (RAM) or any other dynamic storage device, stores information including processor instructions for providing vehicle signature reduction based on location of one or more potential adversarial sources. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing vehicle signature reduction based on location of one or more potential adversarial sources, is provided to the bus 910 for use by the processor from an external input device 912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914, and one or more camera sensors 994 for capturing, recording and causing to store one or more still and/or moving images (e.g., videos, movies, etc.) which also may comprise audio recordings. In some embodiments, for example, in embodiments in which the computer system 900 performs all functions automatically without human input, one or more of external input device 912, display device 914 and pointing device 916 may be omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 125 for providing vehicle signature reduction based on location of one or more potential adversarial sources to the UE 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 982 connected to the Internet hosts a process that provides a service in response to information received over the Internet. For example, server host 982 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 982 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment may be implemented. Chip set 1000 is programmed to provide vehicle signature reduction based on location of one or more potential adversarial sources as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of providing vehicle signature reduction based on location of one or more potential adversarial sources.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors. The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide vehicle signature reduction based on location of one or more potential adversarial sources. The memory 1005 also stores the data associated with or generated by the execution of the inventive steps.

Figure 11:
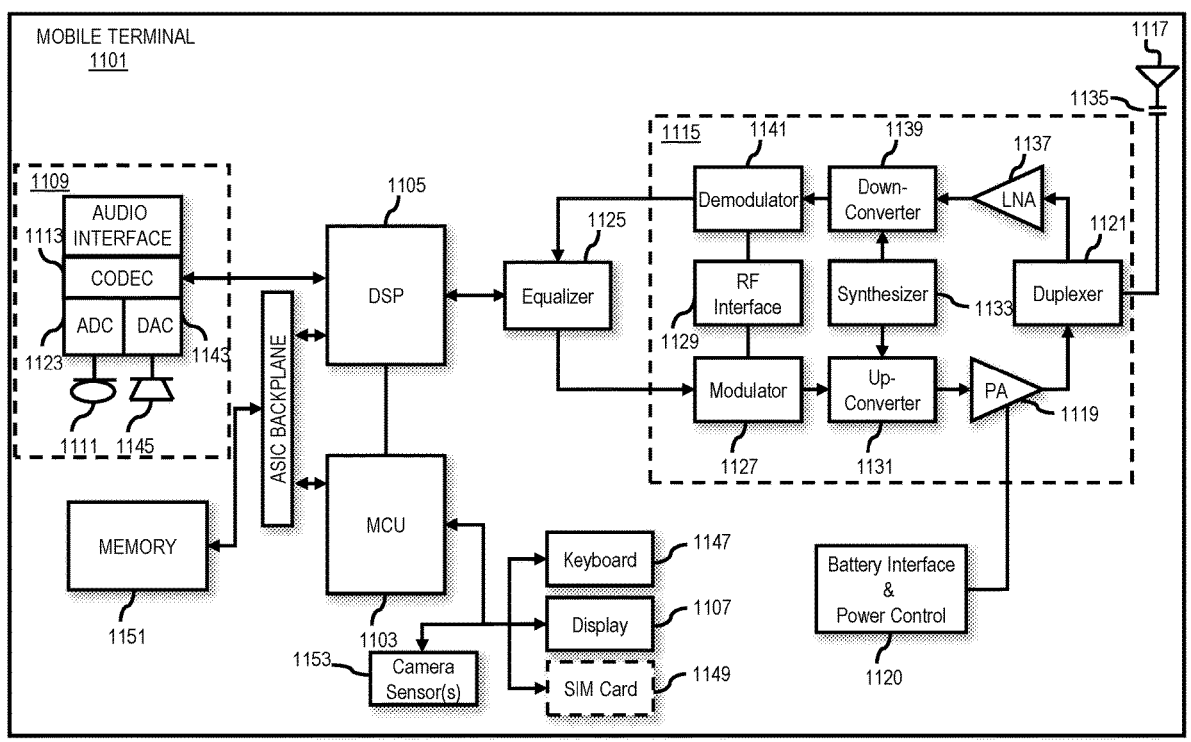
FIG. 11 illustrates a diagram of exemplary components of a mobile terminal for communications, which is capable of operating in the system of FIG. 1A.

FIG. 11 is a diagram of exemplary components of a mobile terminal 1101 (e.g., a mobile device or vehicle or part thereof) for communications, which is capable of operating in the system of FIG. 1A, according to one embodiment. In some embodiments, mobile terminal 1101, or a portion thereof, constitutes a means for performing one or more steps of providing vehicle signature reduction based on location of one or more potential adversarial sources. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of providing vehicle signature reduction based on location of one or more potential adversarial sources. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to provide vehicle signature reduction based on location of one or more potential adversarial sources. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

Further, one or more camera sensors 1153 may be incorporated onto the mobile station 1101 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

We claim:

1. An apparatus comprising at least one processor and at least one non-transitory memory including computer program code instructions, the computer program code instructions configured to, when executed, cause the apparatus to:
   receive a destination for a vehicle as input;
   receive attribute data associated with a source capable of acquiring vehicle signature information, wherein the source is a device comprising a sensor capable of acquiring the vehicle signature information;
   determine a detection range of the source based on the attribute data;
   based on the detection range, select a subset from a plurality of road segments as a route from a location to the destination such that the subset is outside the detection range, wherein the subset is one or more of the plurality of road segments, and wherein each of the plurality of road segments is a road connecting two nodes; and
   cause the vehicle to traverse the route or the portion thereof.

2. The apparatus of claim 1, wherein the attribute data are sensor attribute data indicating sensor types, sensor detection range, or a combination thereof.

3. The apparatus of claim 1, wherein the computer program code instructions, when executed, cause the apparatus to:
   receive attribute data associated with the source;
   determine a detection range of the source based on the attribute data; and
   update a map layer to include a data point indicating a current location of the source and the detection range of the source.

4. The apparatus of claim 1, wherein the subset is a first subset, wherein the route is a first route, and wherein the computer program code instructions, when executed, cause the apparatus to:
   determine a detection avoidance period based on the attribute data, wherein the detection avoidance period indicates an amount of time that a vehicle can be within the detection range without having the vehicle signature information associated with the vehicle being acquired by the vehicle;
   based on the detection avoidance period, select a second subset from the plurality of road segments as a second route from the location to the destination; and
   output the second route or a portion thereof on a user interface.

5. The apparatus of claim 1, wherein the subset is a first subset, wherein the route is a first route, and wherein the computer program code instructions, when executed, cause the apparatus to:
   determine a heading of the source based on the attribute data;
   based on the heading, select a second subset from the plurality of road segments as a second route from the location to the destination; and
   output the second route or a portion thereof on a user interface.

6. A non-transitory computer-readable storage medium having computer program code instructions stored therein, the computer program code instructions, when executed by at least one processor, cause the at least one processor to:
   receive a destination for a vehicle as input;
   receive attribute data associated with a source capable of acquiring vehicle signature information, wherein the source is a device comprising a sensor capable of acquiring the vehicle signature information;
   determine a detection range of the source based on the attribute data;
   based on the detection range, select a subset from a plurality of road segments as a route from a location to the destination such that the subset is outside the detection range, wherein the subset is one or more of the plurality of road segments, and wherein each of the plurality of road segments is a road connecting two nodes; and
   cause the vehicle to traverse the route or the portion thereof.

7. The non-transitory computer-readable storage medium of claim 6, wherein the attribute data are sensor attribute data indicating sensor types, sensor detection range, or a combination thereof.

8. The non-transitory computer-readable storage medium of claim 6, wherein the computer program code instructions, when executed by the at least one processor, cause the at least one processor to:
   receive attribute data associated with the source;
   determine a detection range of the source based on the attribute data; and
   update a map layer to include a data point indicating a current location of the source and the detection range of the source.

9. A method comprising:
   receiving a destination for a vehicle as input;
   receiving attribute data associated with a source capable of acquiring vehicle signature information, wherein the source is a device comprising a sensor capable of acquiring the vehicle signature information;

determining a detection range of the source based on the attribute data;

based on the detection range, selecting a subset from a plurality of road segments as a route from a location to the destination such that the subset is outside the detection range, wherein the subset is one or more of the plurality of road segments, and wherein each of the plurality of road segments is a road connecting two nodes; and causing the vehicle to traverse the route or the portion thereof.

10. The method of claim 9, wherein the attribute data are sensor attribute data indicating sensor types, sensor detection range, or a combination thereof.

11. The method of claim 9 further comprising:

receiving attribute data associated with the source;

determining a detection range of the source based on the attribute data; and updating a map layer to include a data point indicating a current location of the source and the detection range of the source.

* * * * *